US008641356B2

(12) United States Patent
Kyotani

(10) Patent No.: US 8,641,356 B2
(45) Date of Patent: Feb. 4, 2014

(54) ELEVATING CONVEYANCE DEVICE

(75) Inventor: Hisashi Kyotani, Shiga (JP)

(73) Assignee: Daifuku Co., Ltd. (JP)

( * ) Notice: Subject to any disclaimer, the term of this patent is extended or adjusted under 35 U.S.C. 154(b) by 339 days.

(21) Appl. No.: 13/225,177

(22) Filed: Sep. 2, 2011

(65) Prior Publication Data

US 2011/0318152 A1 Dec. 29, 2011

Related U.S. Application Data

(62) Division of application No. 12/020,665, filed on Jan. 28, 2008, now Pat. No. 8,033,778.

(30) Foreign Application Priority Data

Feb. 1, 2007 (JP) ................................ 2007-022540
Oct. 9, 2007 (JP) ................................ 2007-263122

(51) Int. Cl.
*B65G 1/04* (2006.01)

(52) U.S. Cl.
USPC .......... 414/660; 414/673; 187/213; 254/10 B; 254/10 R; 254/89 H

(58) Field of Classification Search
USPC ...... 187/213, 254, 250, 251; 254/10 B, 10 R, 254/2 C, 8 R, 35, 45–47, 89 H, 89 R, 93 L, 254/7 B; 414/10, 11, 659, 673, 660
See application file for complete search history.

(56) References Cited

U.S. PATENT DOCUMENTS

| | | | |
|---|---|---|---|
| 1,993,245 | A | 3/1935 | Meron |
| 2,906,374 | A | 9/1959 | Brumby |
| 3,672,634 | A | 6/1972 | Chaffin |
| 3,757,899 | A | 9/1973 | Smith, Jr. |
| 3,765,648 | A | 10/1973 | Rasmussen et al. |
| 3,934,681 | A | 1/1976 | Herrell |
| 3,941,267 | A | 3/1976 | Greeson |

(Continued)

FOREIGN PATENT DOCUMENTS

| | | | |
|---|---|---|---|
| JP | 51153974 | U | 12/1976 |
| JP | 52044916 | A | 4/1977 |

(Continued)

*Primary Examiner* — Joshua Rudawitz

(74) *Attorney, Agent, or Firm* — St. Onge Steward Johnston & Reens LLC

(57) ABSTRACT

An elevating conveyance device with improved versatility which can be utilized for transferring an automobile body in an automobile assembly line, etc., and according to a first aspect of the invention, the elevating conveyance device includes a multistage extensible column, a transfer means, and an extending and contracting drive mechanism, where the multistage extensible column includes a fixed column portion, one or more mid-stage elevating column portions, and a final-stage elevating portion, the transfer means is provided on the final-stage elevating portion, and the extending and contracting drive mechanism includes a counter weight supported on the fixed column portion movably vertically in a range of the height of the fixed column portion, a winding transmission tool which applies the gravity of the counter weight upward to the next mid-stage elevating column portion, an elevating drive means which drives and elevates the next mid-stage elevating column portion with respect to the fixed column portion, and winding transmission tools which convert an upward movement of the mid-stage elevating column portion into an upward movement of the next mid-stage elevating column portion or final-stage elevating portion.

9 Claims, 20 Drawing Sheets

(56) References Cited

U.S. PATENT DOCUMENTS

| | | | | | |
|---|---|---|---|---|---|
| 4,313,708 | A | * | 2/1982 | Tiliakos | 414/498 |
| 4,457,401 | A | * | 7/1984 | Taylor et al. | 187/208 |
| 4,498,370 | A | | 2/1985 | Breeden et al. | |
| 4,763,761 | A | | 8/1988 | McKinsey et al. | |
| 4,892,028 | A | | 1/1990 | Stivers | |
| 5,351,787 | A | | 10/1994 | Hoch et al. | |
| 5,450,929 | A | | 9/1995 | Ohgita et al. | |
| 5,466,109 | A | | 11/1995 | Iizuka | |
| 6,817,449 | B2 | | 11/2004 | Berends | |
| 6,845,848 | B1 | | 1/2005 | Kritzer | |
| 7,770,868 | B2 | | 8/2010 | Koop | |
| 2004/0228710 | A1 | | 11/2004 | Ueda | |
| 2010/0322752 | A1 | | 12/2010 | Ueda et al. | |

FOREIGN PATENT DOCUMENTS

| | | | |
|---|---|---|---|
| JP | 58092221 | U | 6/1983 |
| JP | 63134498 | A | 6/1988 |
| JP | 5043014 | A | 2/1993 |

* cited by examiner

ELEVATING CONVEYANCE DEVICE

CROSS-REFERENCE TO RELATED APPLICATIONS

This application is a division of U.S. patent application Ser. No. 12/020,665 filed Jan. 28, 2008 now U.S. Pat. No. 8,033,778, which claims priority of Japanese patent application Nos. JP2007-022540 filed Feb. 1, 2007 and JP2007-263122 filed Oct. 9, 2007, the content of which is incorporated herein by reference.

FIELD OF THE INVENTION

The present invention relates to an elevating conveyance device which can be used for transfer, etc., of an automobile body in an automobile assembly line.

BACKGROUND OF THE INVENTION

As an elevating conveyance device which can be used for transfer, etc., of an automobile body, there is known a table-lifter type equipped with a transfer means that can advance and withdraw horizontally on an elevating base, and as described in Japanese Published Unexamined Utility Model Application No. S58-92221, a drop-lifter type equipped with a transfer means that can advance and withdraw horizontally on an elevating body movable vertically along columns. A multijoint robot type elevating conveyance device that can be used for a transfer device is also known.

The table lifter type elevating conveyance device and the multijoint robot type transfer elevating conveyance device realize a comparatively free layout and can be freely installed and used on a floor surface as long as the floor surface is rigid, however, it cannot be used out of a transfer point with a comparatively small lifting distance. In addition, in the multijoint robot type transfer elevating conveyance device, the degree of freedom of the transfer path is high, however, the facility cost remarkably increases. On the other hand, in the drop-lifter type elevating conveyance device as described in Japanese Published Unexamined Utility Model Application No. S58-92221, the lifting distance is allowed to be long, however, the upper ends of the columns must be joined to and supported by a beam on the ceiling side, so that the device cannot be easily installed on the floor and used. That is, the device is insufficient in versatility.

SUMMARY OF THE INVENTION

An object of the present invention is to provide an elevating conveyance device which can solve the conventional problems described above, and an elevating conveyance device of a first aspect of the invention includes (as is shown with reference numerals of embodiments described later) a base 2; a multistage extensible column 1 extensible vertically stood on the base 2; an object support (transfer means 14); and an extending and contracting drive mechanism, wherein the multistage extensible column 1 includes a fixed column portion 3 to be fixed onto the base 2, one or more mid-stage elevating column portions 4*a* and 5*a* movable vertically with respect to this fixed column portion 3, and a final-stage elevating portion 6*a* movable vertically with respect to the mid-stage elevating column portion 5*a*, the object support (transfer means 14) is provided on the final-stage elevating portion 6*a* of the multistage extensible column 1, and the extending and contracting drive mechanism includes a counter weight 20 supported on the fixed column portion 3 of the multistage extensible column 1 movably vertically within a range of the height of the fixed column portion 3, a winding transmission tool 21*a* which applies the gravity of the counter weight 20 upward to the next mid-stage elevating column portion 4*a*, an elevating drive means 24 which drives and elevates the next mid-stage elevating column portion 4*a* with respect to the fixed column portion 3, and winding transmission tools 22*a* and 23*a* which convert an upward movement of the next mid-stage elevating column portion 4*a* with respect to the fixed column portion 3 into an upward movement of the next mid-stage elevating column portion 5*a* or final-stage elevating portion 6*a* with respect to this mid-stage elevating column portion 4*a*.

In the elevating conveyance device of the present invention constituted as described above, even when the object support (transfer means 14) to be elevated has a load cradle (running forks 15*a* and 15*b*) that advances and withdraws horizontally and laterally, to secure self-standing stability in the state that the multistage extensible column 1 extends upward and the load cradle (running forks 15*a* and 15*b*) supporting an object advances horizontally, the widths in the load cradle advancing and withdrawing direction of the multistage extensible column 1 and the base 2 are set to be properly wide and the base 2 is firmly installed and fixed onto the floor surface, whereby the elevating conveyance device can be utilized as a free-layout type self-standing elevating conveyance device similar to the conventional table lifter type or multijoint robot type elevating conveyance device, which can be freely installed and used on an arbitrary location on the floor surface. In addition, by using the multistage extensible column 1, while the elevating conveyance path length (lifting distance) is allowed to be long, the multistage extensible column 1 is urged in the extending direction by the counter weight 20 and the winding transmission tools 21*a*, 22*a*, and 23*a*, so that the device can elevate and convey a heavy object by the elevating drive means 24 that is comparatively small in capability. The counter weight 20 moves vertically within the range of the height of the fixed column portion 3 that can be made substantially equal in height to the height when the multistage extensible column 1 contracts to the lowest height, so that when the counter weight 20 reaches its upper limit position, that is, when the object support (transfer means 14) is lowered to its lower limit position, the total height and the gravity of the whole device can be made low.

To carry out the present invention constituted as described above, in detail, a constitution can be employed in which the multistage extensible column 1 has mid-stage elevating column portions 4*a* and 4*b* (5*a* and 5*b*) and final-stage elevating portions 6*a* and 6*b* on both left and right sides of one fixed column portion 3, the pair of left and right final-stage elevating portions 6*a* and 6*b* are joined integrally by a horizontal joint member 13, and the object support (transfer means 14) is supported by the horizontal joint member 13 so that the object support (transfer means 14) supports an object on one side of the fixed column portion 3.

With this constitution, a comparatively wide space occupied by one fixed column portion 3 whose horizontal width can be made wide can be utilized as an elevating space for one large counter weight 20. Therefore, in combination with stable supporting of the object support (transfer means 14) by the pair of left and right mid-stage elevating column portions 4*a* and 4*b* (5*a* and 5*b*) and the final-stage elevating portions 6*a* and 6*b*, the elevating conveyance device that can handle a heavy object can be constituted comparatively compactly.

A constitution can be employed in which a pair of left and right multistage extensible columns 51A and 51B are provided parallel so that their final-stage elevating portions 6*a* and 6*b* face each other, the final-stage elevating portions 6*a* and 6*b* of the multistage extensible columns 51A and 51B are joined integrally to each other by a horizontal joint member 13, and the object support (transfer means 14) is supported by the horizontal joint member 13 so that the object support (transfer means 14) supports an object between the multistage extensible columns 51A and 51B.

In this case, a constitution can be employed in which the object support (transfer means 14) has a load cradle (running forks 15*a* and 15*b*) that can advance and withdraw horizontally, and this load cradle (running forks 15*a* and 15*b*) can advance and withdraw both forward and rearward from a withdrawn position at an intermediate position of the multistage extensible columns 51A and 51B.

With the constitution described above having integrally-joined, parallel final-stage elevating portions 6*a* and 6*b*, in the state that the object support (transfer means 14) supports an object between the multistage extensible columns 51A and 51B, no fall-down moment is applied to the multistage extensible columns 51A and 51B, so that the device can be easily utilized as a self-standing installation type elevating conveyance device which can handle a heavy object. In this case, by employing the constitution described above having a load cradle that can advance and withdraw, the device can be utilized as an elevating conveyance device which can convey an object from one to the other of the front and rear sides of an elevating conveyance device installation location in a plan view.

The present invention also proposes an elevating conveyance device according to a second aspect of the invention that does not use the counter weight in addition to the first aspect of the invention using the counter weight described above.

That is, the elevating conveyance device according to the second aspect of the invention includes (as is shown with the reference numerals of embodiments described later) a base 2; a multistage extensible column 1 extensible vertically stood on the base 2; an object support (transfer means 14); and an extending and contracting drive mechanism, wherein the multistage extensible column 1 includes a fixed column portion 3 to be fixed onto the base 2, one or more mid-stage elevating column portions 4*a* and 5*a* movable vertically with respect to the fixed column portion 3, and a final-stage elevating portion 6*a* movable vertically with respect to the mid-stage elevating column portion 4*a* and 5*a*, the object support (transfer means 14) is provided on the final-stage elevating portion 6*a* of the multistage extensible column 1, and the extending and contracting drive mechanism is provided in the fixed column portions 3 and includes an elevating drive means 120 which drives and elevates the next mid-stage elevating column portion 4*a*, pulley-wound type winding suspending chains 121*a* and 122*a* which are provided in the mid-stage elevating column portions 4*a* and 5*a* and convert upward movement of the mid-stage elevating column portions 4*a* and 5*a* with respect to the previous column portion 3 and 4*a* into an upward movement of the next mid-stage elevating column portion 5*a* or final-stage elevating portion 6*a* with respect to the mid-stage elevating column portion 4*a* or 5*a*, a fluid pressure cylinder 137A which urges the next mid-stage elevating column portion 4*a* upward with respect to the fixed column portion 3, and fluid pressure cylinders 138A and 139A which urge the next mid-stage elevating column portion 5*a* or final-stage elevating portion 6*a* upward with respect to the mid-stage elevating column portion 4*a* or 5*a*.

In the elevating conveyance device according to the second aspect of the invention described above, different from the elevating conveyance device of the first aspect of the invention described above, the weight balance is righted by urging the mid-stage elevating column portions 4*a* and 5*a* and the final-stage elevating portion 6*a* by urging forces of the fluid pressure cylinders 137A through 139A separately without using a large and heavy balance weight, so that a heavy object can be conveyed vertically while downsizing and reduction in weight of the whole device are realized.

That is, in the multistage extensible column 1 constituted so that, by the pulley-wound type winding suspending chains 121*a* and 122*a* provided in the fixed column portion 3 and the mid-stage elevating column portion 4*a* or 5*a*, when the mid-stage elevating column portion 4*a* or 5*a* moves up with respect to the previous column portions 3 or 4*a*, the next mid-stage elevating column portion 5*a* or final-stage elevating portion 6*a* is moved upward with respect to the mid-stage elevating column portion 4*a* or 5*a*, a balance weight is hung on the end of the pulley-wound type winding suspending chain provided in the fixed column portion 3, and if all elevating portions (excluding the object) are balanced in weight by this balance weight, for example, when two mid-stage elevating column portions are provided, assuming that the total weight of the final-stage elevating portion 6*a* is defined as $W_1$ and the total weights of the mid-stage elevating column portions 4*a* and 5*a* are defined as $W_2$ and $W_3$, the downward loading weight F to be applied in the direction of hanging the balance weight by the pulley-wound type winding suspending chain of the fixed column portion 3 becomes $F=3W_1+2W_2+W_3$, and a large and heavy balance weight corresponding to $F=3W_1+2W_2+W_3$ is required, and the whole device inevitably increases in size and weight.

However, according to the second aspect of the invention, the mid-stage elevating column portions 4*a* and 5*a* and the final-stage elevating portion 6*a* are urged upward by urging forces of the fluid pressure cylinders 137A through 139A to right the weight balance, so that the weights of the mid-stage elevating column portions 4*a* and 5*a* and the final-stage elevating portion 6*a* increase according to the weights of the fluid pressure cylinders 137A through 139A, however, without using a large and heavy balance weight, the loading weight to be applied to the elevating drive means 120 for driving and elevating the next mid-stage elevating column portion 4*a* with respect to the fixed column portion 3 is greatly reduced, and accordingly, a small-sized and light-weight elevating conveyance device which can use an elevating drive means 12 with small capability while the device is capable of elevating and conveying a heavy object is realized. The fluid pressure cylinders 137A through 139A which separately urge the mid-stage elevating column portions 4*a* and 5*a* and the final-stage elevating portion 6*a* upward serve as dampers when the pulley-wound type winding suspending chains 121*a* and 122*a* and a winding suspending chain 125*a* used as the elevating drive means 120 for driving and elevating the next mid-stage elevating column portion 4*a* with respect to the fixed column portion 3 are broken, so that impact drop of the mid-stage elevating column portions 4*a* and 5*a* and the final-stage elevating portion 6*a* can be prevented and the safety can be improved.

To carry out the second aspect of the invention, it is allowed that cylinder main bodies 137*a* through 139*a* of the fluid pressure cylinders 137A through 139A are attached to the previous column portions 3 through 5*a*, and piston rods 137*b* through 139*b* projecting downward from the cylinder main bodies 137*a* through 139*a* so as to advance and withdraw are arranged in a direction of suspending the next mid-stage elevating column portion 4*a* or 5*a* or final-stage elevating portion 6*a*.

With this constitution, it is not necessary to apply a compressive force to the piston rods 137*b* through 139*b* of the fluid pressure cylinders 137A through 139A which urge the mid-stage elevating column portions 4*a* and 5*a* and the final-stage elevating portion 6*a* upward, respectively, so that comparatively small-diameter cylinders can be used, and this is useful for reducing the size and weight of the whole device.

In addition, a constitution can be employed in which each of the fluid pressure cylinders 137A through 139A generates a fixed upward urging force substantially balanced with the weight of the one mid-stage elevating column portion 4*a* or 5*a* or the final-stage elevating portion 6*a* that each of the fluid pressure cylinders 137A through 139A directly urges.

With this constitution, the weight of all elevating portions in a state that they do not elevate and convey an object can be canceled by upward urging forces of the fluid-pressure cylinders 137A through 139A, and this is effective when the object is comparatively light in weight or when the weight of the object to be handled is not constant.

Further, a constitution can be employed in which the urging force of the fluid-pressure cylinder 139A that urges upward the final-stage elevating portion 6*a* can be switched to an upward urging force almost balanced with the sum ($W_0+W_1$) of the weight $W_1$ of this final-stage elevating portion 6*a* and the weight $W_0$ of the object W loaded on the object support (transfer means 14).

This constitution is preferable when the object to be handled has a fixed weight, and by employing this constitution not only when driving and elevating an empty final-stage elevating portion 6*a* on which no object is loaded, but also when elevating and conveying the object, only by switching the urging force of the fluid pressure cylinder 139A that urges the final-stage elevating portion 6*a* upward, the whole elevating section is theoretically made weightless, and driving and elevating can always be made by a very small elevating and driving force. When a plurality of kinds of objects are handled and their weights are constant in each type, the urging force of the fluid pressure cylinder 139A that urges the final-stage elevating portion 6*a* upward is switched to an urging force preset corresponding to the weight of each object.

The elevating drive means 120 may include a winding suspending chain 125*a* which drives and elevates the next mid-stage elevating column portion 4*a* with respect to the fixed column portion 3, and a driving device 127 which drives the winding suspending chain 125*a*, or it is also allowed that the fluid pressure cylinder 137A that urges upward the next mid-stage elevating column portion 4*a* with respect to the fixed column portion 3 can be commonly used as the elevating drive means 120.

The elevating drive means 120 which drives and elevates the next mid-stage elevating column portion 4*a* with respect to the fixed column portion 3 can be easily carried out, and the fluid pressure cylinder 137A that urges upward the next mid-stage elevating column portion 4*a* with respect to the fixed column portion 3 can be commonly used as the elevating drive means 120, so that the number of components of the whole device can be reduced, the structure can be simplified, and further reduction in size and weight is realized.

Also in the elevating conveyance device of the second aspect of the invention, the same working effect as in the case of the first aspect of the invention can be obtained by employing the constitutions described as detailed examples of the elevating conveyance device of the first aspect of the invention.

BRIEF DESCRIPTION OF THE DRAWINGS

For a complete understanding of the above and other features of the invention, reference shall be made to the following detailed description of the preferred embodiments of the invention and to the accompanying drawings, wherein.

DETAILED DESCRIPTION OF THE INVENTION

Figure 1A:
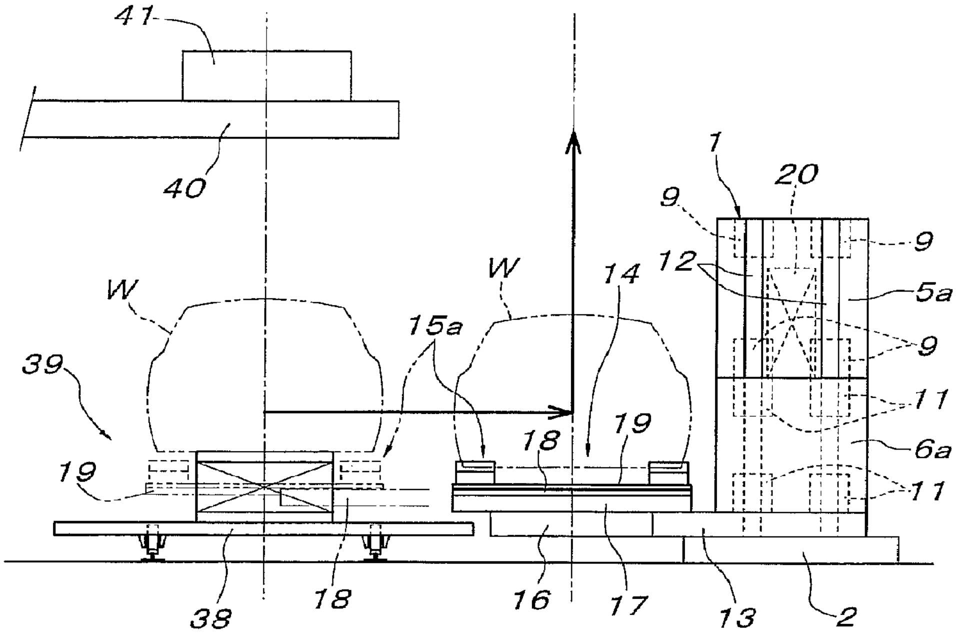
FIG. 1A is a side view showing a state that an object is transferred onto or from a conveyance carriage of a floor surface conveyance line in a transfer device of a first embodiment.

Next, a first embodiment of the present invention carried out as a transfer device will be described with reference to the accompanying FIG. 1 through FIG. 3. The reference numeral 1 denotes a multistage extensible column, and includes a fixed column portion 3 stood on a base 2 fixed onto the floor surface with anchors or the like, a pair of left and right first mid-stage elevating column portions 4*a* and 4*b* supported movably vertically on both left and right outer sides of the fixed column portion 3, a pair of left and right second mid-stage elevating column portions 5*a* and 5*b* supported movably vertically on the outer sides of the first mid-stage elevating column portions 4*a* and 4*b*, and a pair of left and right final-stage elevating portions 6*a* and 6*b* supported movably vertically on the outer sides of the second mid-stage elevating column portions 5*a* and 5*b*. The fixed column portion 3 is in a rectangular column shape long in the left and right direction in a plan view.

Any elevating guide means can be used for the elevating column portions 4*a* through 5*b* and the final-stage elevating portions 6*a* and 6*b*, however, in this embodiment, the pair of left and right first mid-stage elevating column portions 4*a* and 4*b* are supported on the fixed column portion 3 movably vertically by slide guides 7 fixed to the side surfaces of the fixed column portion 3 and slide guide rails 8 which are fixed across the whole heights of the inner side surfaces of the first mid-stage elevating column portions 4*a* and 4*b* and engage with the slide guides 7, and the pair of left and right second mid-stage elevating column portions 5*a* and 5*b* are supported on the first mid-stage elevating column portions 4*a* and 4*b* movably vertically by slide guides 9 fixed to the outer sides of the first mid-stage elevating column portions 4*a* and 4*b* and slide guide rails 10 which are fixed across the whole heights of the inner side surfaces of the second mid-stage elevating column portions 5*a* and 5*b* and engage with the slide guides 9, and the pair of left and right final-stage elevating portions 6*a* and 6*b* are supported movably vertically on the second mid-stage elevating column portions 5*a* and 5*b* by slide guides 11 fixed to the inner side surfaces of the final-stage elevating portions 6*a* and 6*b* and slide guide rails 12 which are fixed to the outer sides of the second mid-stage elevating column portions 5*a* and 5*b* across the whole heights thereof.

Figure 1B:
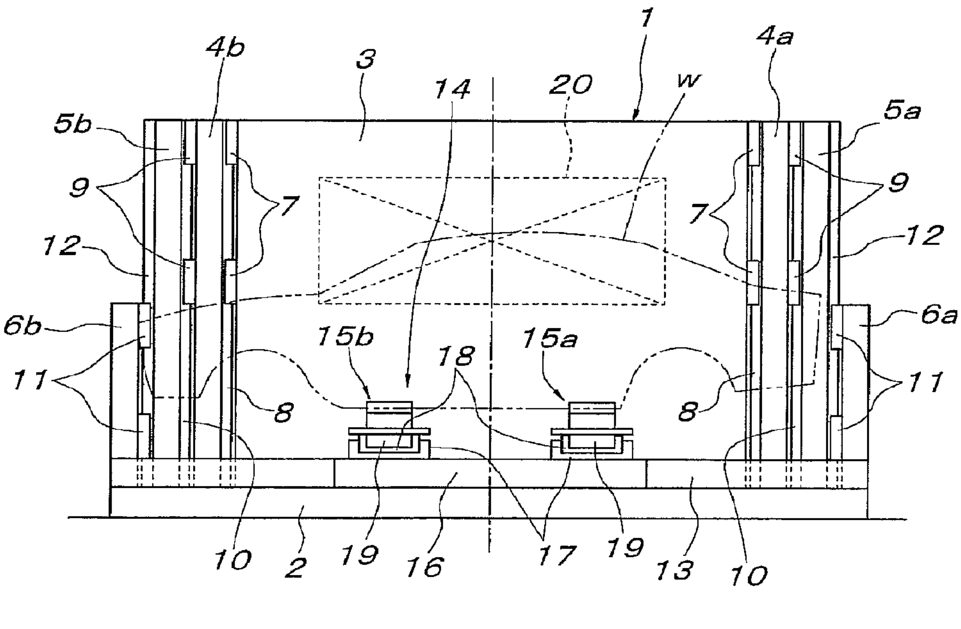
FIG. 1B is a front view of the transfer device in the same state.

The first mid-stage elevating column portions 4*a* and 4*b* and the second mid-stage elevating column portions 5*a* and 5*b* have the same height as that of the fixed column portion 3, and when they are at the lower limit positions as shown in FIG. 1, the lower ends thereof are supported on the base 2 and the upper ends thereof are substantially flush with the upper end of the fixed column portion 3. On the other hand, the final-stage elevating portions 6*a* and 6*b* have a height substantially half of the height of the fixed column portion 3 and each mid-stage elevating column portion 4*a* through 5*b*, and when they are at the lower limit positions, the lower ends thereof are supported on the base 2.

The lower ends of the pair of left and right final-stage elevating portions 6*a* and 6*b* are joined integrally to each other by a horizontal joint member 13 on the front side of the multistage extensible column 1, and at the central position in the longitudinal direction of this horizontal joint member 13, a transfer means 14 as an object support is provided so as to project forward at the right angle from the fixed column portion 3. This transfer means 14 includes a pair of left and right running forks 15*a* and 15*b* which advance and withdraw horizontally in conjunction with each other as a load cradle as shown in FIG. 2. Each running fork 15*a* or 15*b* includes a fixed rail member 17 fixed on a base portion 16, a mid-stage movable rail member 18 supported so as to advance and withdraw on the fixed rail member 17, and a load receiving rail member 19 supported so as to advance and withdraw on the mid-stage movable rail member 18, and has an advancing and withdrawing drive means (not shown). The advancing and withdrawing drive means of the running fork 15*a*, 15*b* is conventionally known, and the advancing and withdrawing drive means moves the mid-stage movable rail member 18 so as to advance and withdraw with respect to the fixed rail member 17, in conjunction with the advancing or withdrawing movement of the mid-stage movable rail member 18, it can advance or withdraw the load receiving rail member 19 in the same direction as that of the mid-stage movable rail member 18. Therefore, as shown in FIG. 1A and FIG. 2A, the load receiving rail member 19 can be moved so as to advance and withdraw between a withdrawn position overlapping just above the fixed rail member 17 and an advanced position separated sideward from the region above the fixed rail member 17.

The extending and contracting drive mechanism of the multistage extensible column 1 will be described. As shown in FIG. 3, the extending and contracting drive mechanism includes a counter weight 20, pairs of left and right winding transmission tools 21*a* and 21*b*, 22*a* and 22*b*, and 23*a* and 23*b*, and an elevating drive means 24. The counter weight 20 is installed movably vertically inside the fixed column portion 3 in a rectangular column shape, and an elevating guide rail 25 can also be used if necessary. One ends of the first wounding transmission tools 21*a* and 21*b* are latched on upper portions of both left and right ends of the counter weight 20, the other ends are latched on latching tools 26*a* and 26*b* fixed onto positions close to lower ends of the pair of left and right first mid-stage elevating column portions 4*a* and 4*b*, and intermediate portions are wound around pairs of left and right turning guide wheels 27*a* and 28*a* and 27*b* and 28*b*, respectively, axially supported onto positions close to the upper end inside the fixed column portion 3, and when the first mid-stage elevating column portions 4*a* and 4*b* are at the lower limit positions, the counter weight 20 is at its upper limit position.

One ends of the second winding transmission tools 22*a* and 22*b* are latched on latching tools 29*a* and 29*b* fixed to positions close to upper ends of both left and right sides of the fixed column portion 3, the other ends are latched on latching tools 30*a* and 30*b* fixed to positions close to lower ends of the pair of left and right second mid-stage elevating column portions 5*a* and 5*b*, and intermediate portions are wound around turning guide wheels 31*a* and 31*b* axially supported on positions close to upper ends of the first mid-stage elevating column portions 4*a* and 4*b*. One ends of the third winding transmission tools 23*a* and 23*b* are latched on latching tools 32*a* and 32*b* fixed onto positions close to the upper ends of the second mid-stage elevating column portions 5*a* and 5*b*, the other ends are latched on latching tools 33*a* and 33*b* fixed onto positions at intermediate heights of the pair of left and right final-stage elevating portions 6*a* and 6*b*, and the intermediate portions are wound around turning guide wheels 34*a* and 34*b* axially supported on positions near upper ends of the second mid-stage elevating column portions 5*a* and 5*b*. As the winding transmission tools 21*a* and 21*b* through 23*a* and 23*b*, chains or wire ropes may be used, and as the turning guide wheels 27*a* through 28*b*, 31*a* and 31*b*, and 34*a* and 34*b*, sprockets, wheels, or pulleys can be used.

The elevating drive means 24 includes a motor 37 for driving and interlocks the turning guide wheels 27*a* and 27*b* on the counter weight 20 side around which the pair of left and right first winding transmission tools 21*a* and 21*b* are wound with each other via chains 35*a* and 35*b* and gear trains 36*a* and 36*b*, and elevates the first mid-stage elevating column portions 4*a* and 4*b* with respect to the fixed column portion 3 by rotating forward or reverse the first winding transmission tools 21*a* and 21*b*. The weight of the counter weight 20 can be set to be substantially equal to or slightly lighter than the total weight of all elevating members that elevate with respect to the fixed column portion 3, that is, the mid-stage elevating column portions 4*a* through 5*b*, the final-stage elevating portions 6*a* and 6*b*, the horizontal joint member 13, and the transfer means 14.

With the constitution described above, as shown in FIG. 1 and FIG. 3, when the multistage extensible column 1 is in a contracted state and the mid-stage elevating column portions 4*a* through 5*b* and the final-stage elevating portions 6*a* and 6*b* are at the lower limit positions, the transfer means 14 is at its lower limit position closest to the floor surface, and the counter weight 20 is at its upper limit position inside the fixed column portion 3. The height of the entire transfer device in this state is equal to the height of the upper ends of the fixed column portion 3 and the mid-stage elevating column portions 4*a* through 5*b* arranged parallel at substantially the same level. From this state, when the motor 37 of the elevating drive means 24 is actuated to drive and rotate the turning guide wheels 27*a* and 27*b* around which the first winding transmission tools 21*a* and 21*b* are wound via gear trains 36*a* and 36*b* and chains 35*a* and 35*b* in a direction in which the first winding transmission tools 21*a* and 21*b* lift the first mid-stage elevating column portions 4*a* and 4*b*, according to upward movements of the first mid-stage elevating column portions 4*a* and 4*b* with respect to the fixed column portion 3, the second winding transmission tools 22*a* and 22*b* of the first mid-stage elevating column portions 4*a* and 4*b* are relatively pulled downward by the latching tools 29*a* and 29*b* on the fixed column portion 3 side, whereby the second mid-stage elevating column portions 5*a* and 5*b* are lifted via the latching tools 30*a* and 30*b* with respect to the first mid-stage elevating column portions 4*a* and 4*b* being raised. Further, according to the upward movements of the second mid-stage elevating column portions 5*a* and 5*b* with respect to the first mid-stage elevating column portions 4*a* and 4*b*, the third winding transmission tools 23*a* and 23*b* of the second mid-stage elevating column portions 5*a* and 5*b* are relatively pulled downward by the latching tools 32*a* and 32*b* on the first mid-stage elevating column portion 4*a* and 4*b* sides, and the final-stage elevating portions 6*a* and 6*b* are lifted via the latching tools 33*a* and 33*b* with respect to the first mid-stage elevating column portions 4*a* and 4*b* being raised.

Figure 2B:
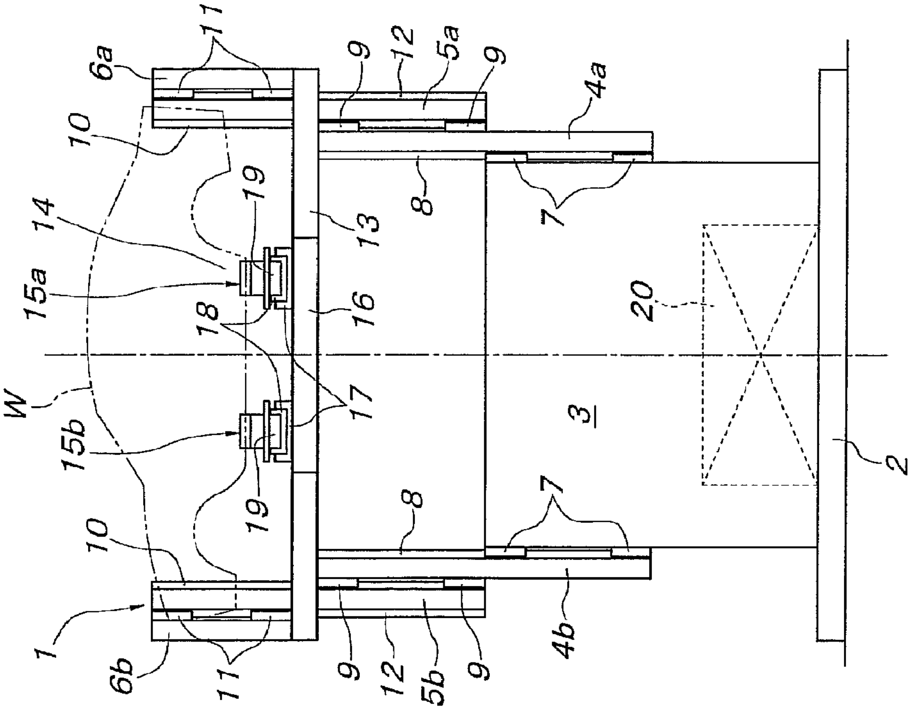
FIG. 2B is a front view of the transfer device in the same state.
Figure 2A:
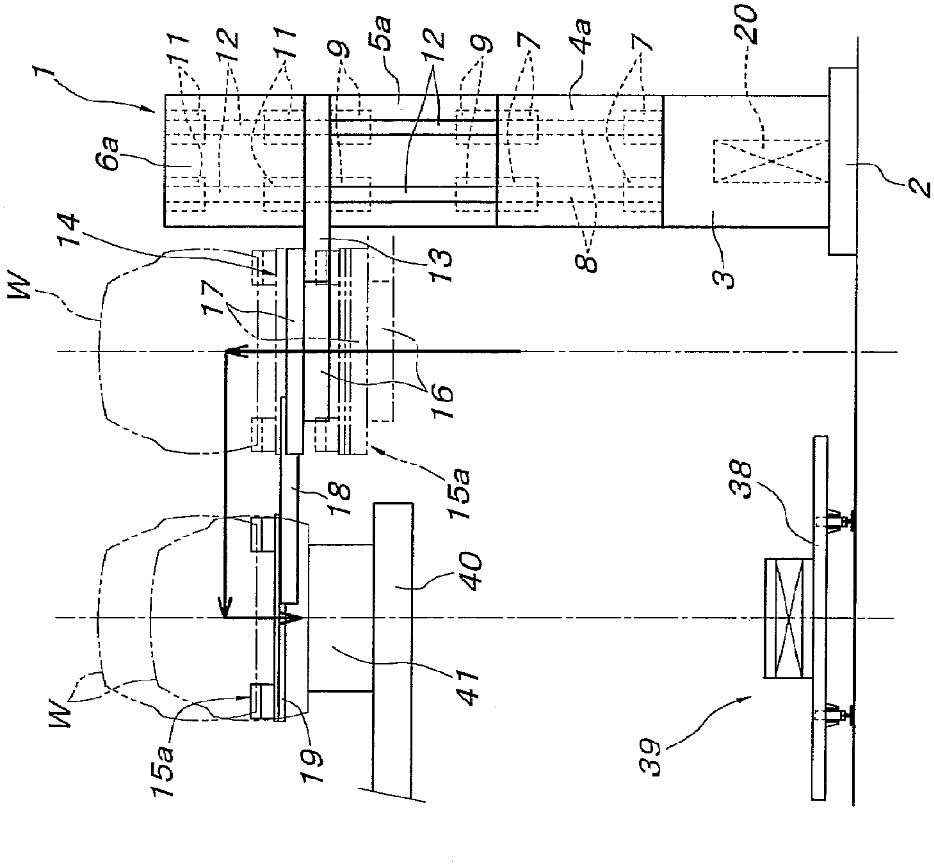
FIG. 2A is a side view showing a state that an object is transferred onto or from a load cradle of an upstairs slab in the transfer device of the first embodiment.
Figure 4:
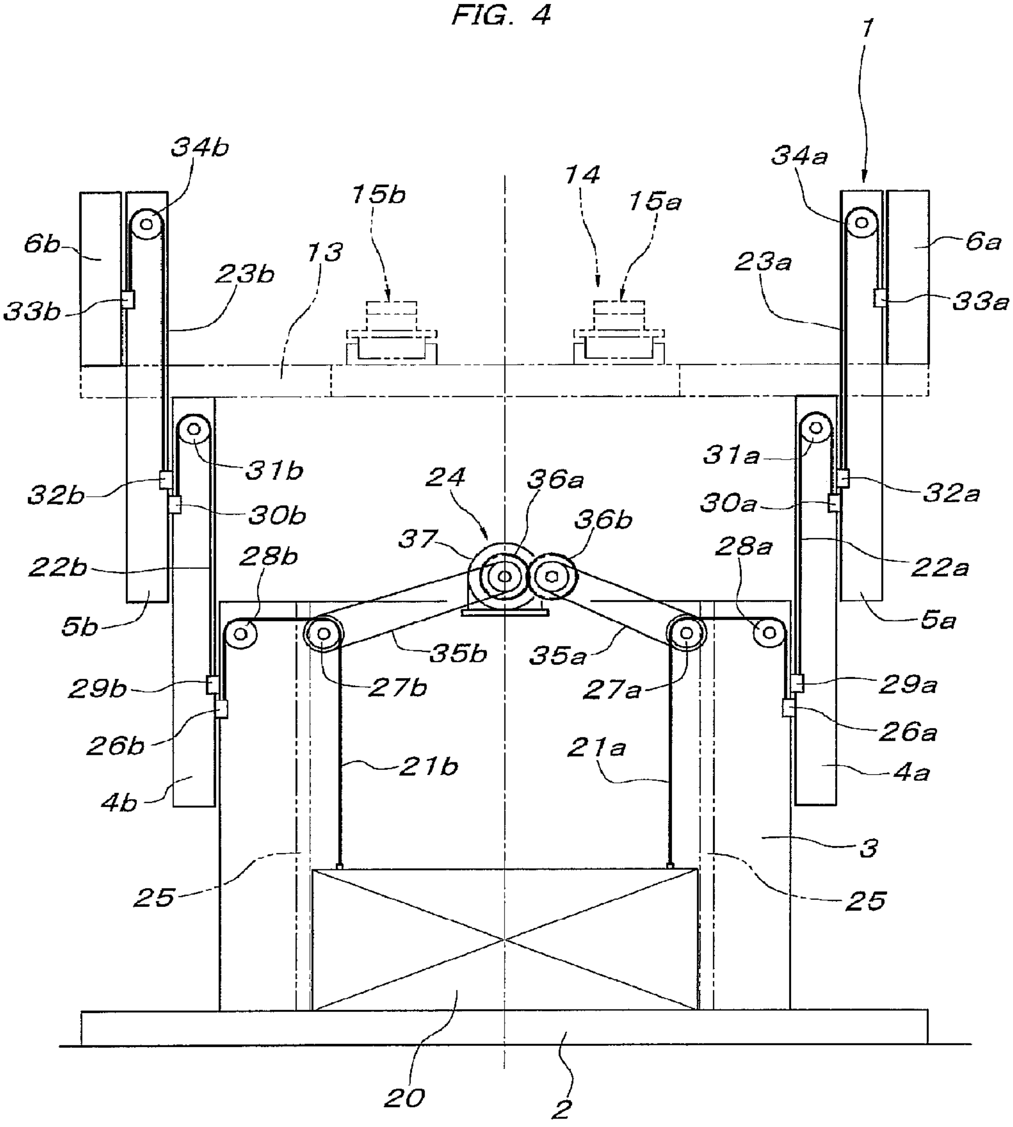
FIG. 4 is a front view showing an extending and contracting drive mechanism of a multistage extensible column in an extended state in the transfer device of the first embodiment.
Figure 5:
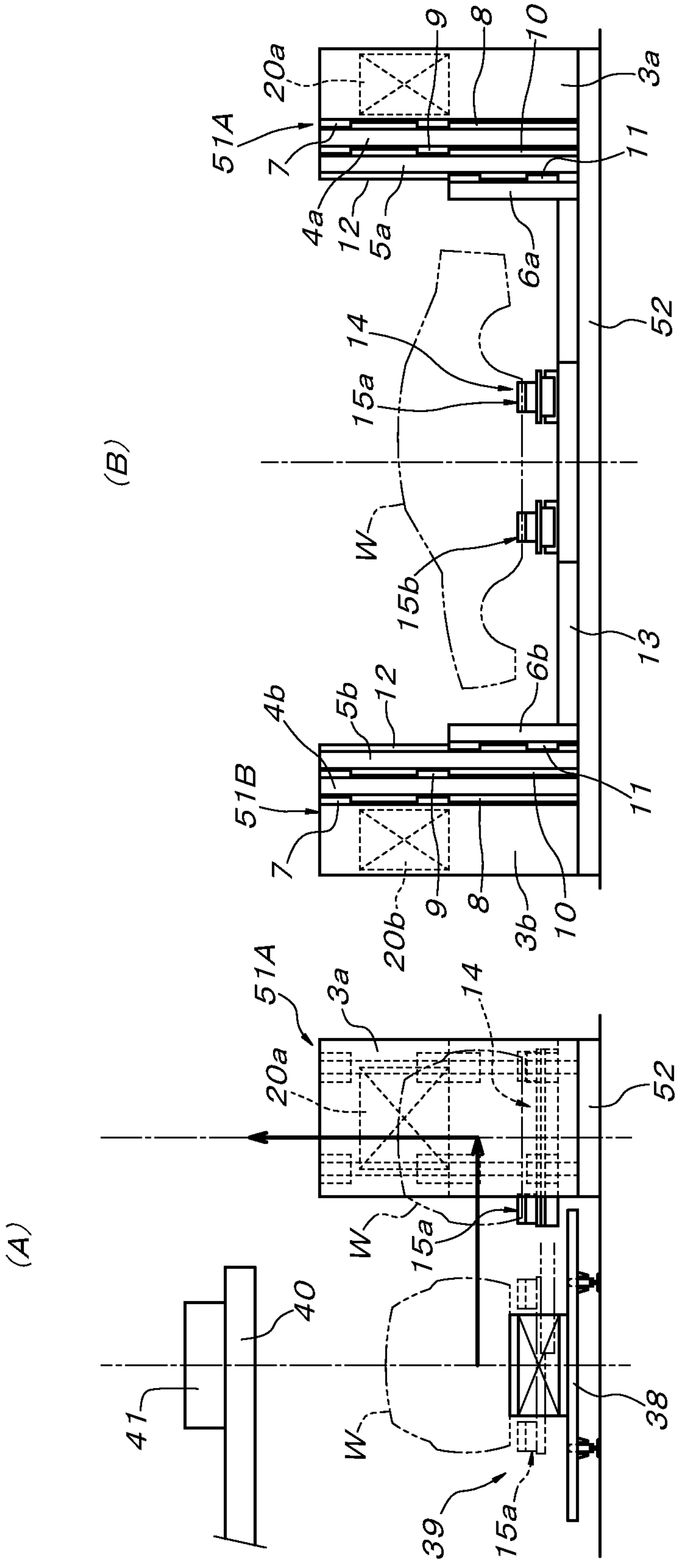
FIG. 5A is a side view showing a state that an object is transferred onto or from the conveyance carriage of the floor surface conveyance line in a transfer device of a second embodiment.
FIG. 5B is a front view of the transfer device in the same state.
Figure 6B:
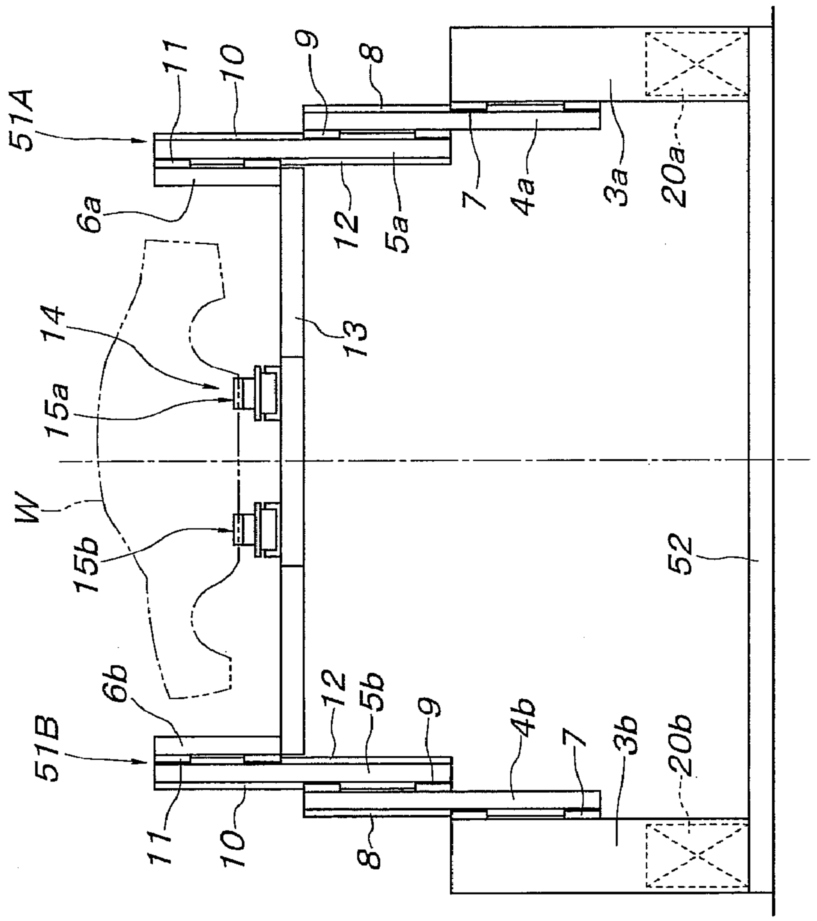
FIG. 6B is a front view of the transfer device in the same state.
Figure 6A:
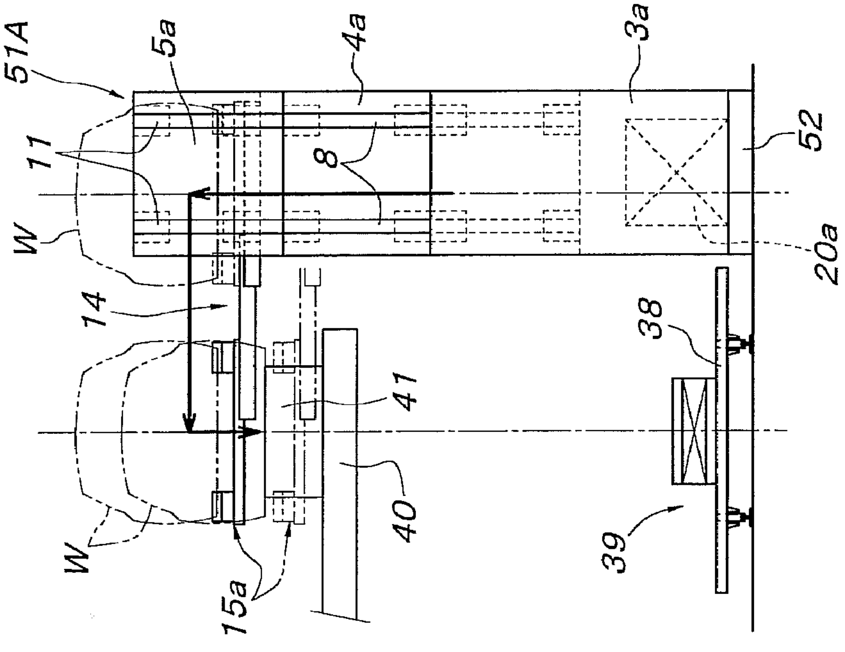
FIG. 6A is a side view showing a state that an object is transferred onto or from the load cradle of the upstairs slab in the transfer device of the second embodiment.
Figure 7:
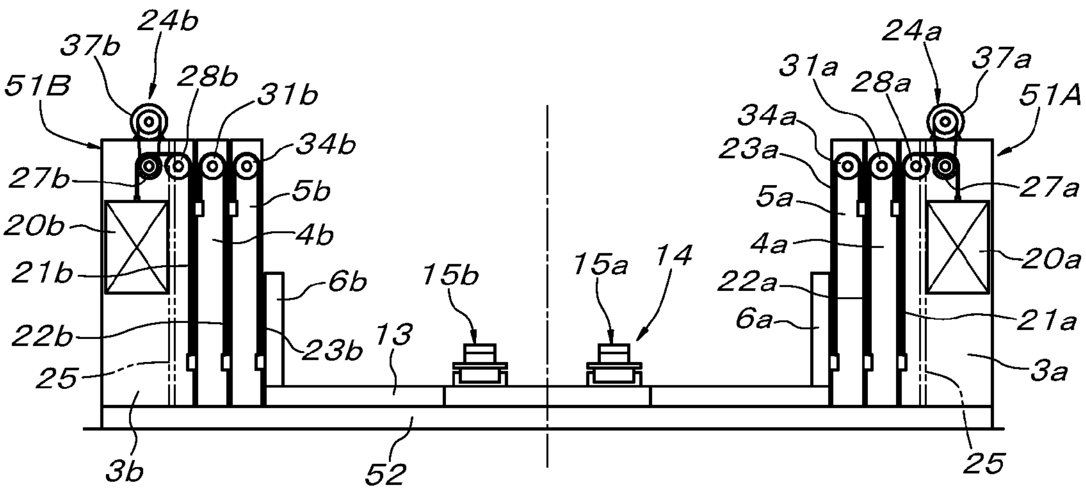
FIG. 7 is a front view showing an extending and contracting drive mechanism of a multistage extensible column in a contracted state in the transfer device of the second embodiment.
Figure 8:
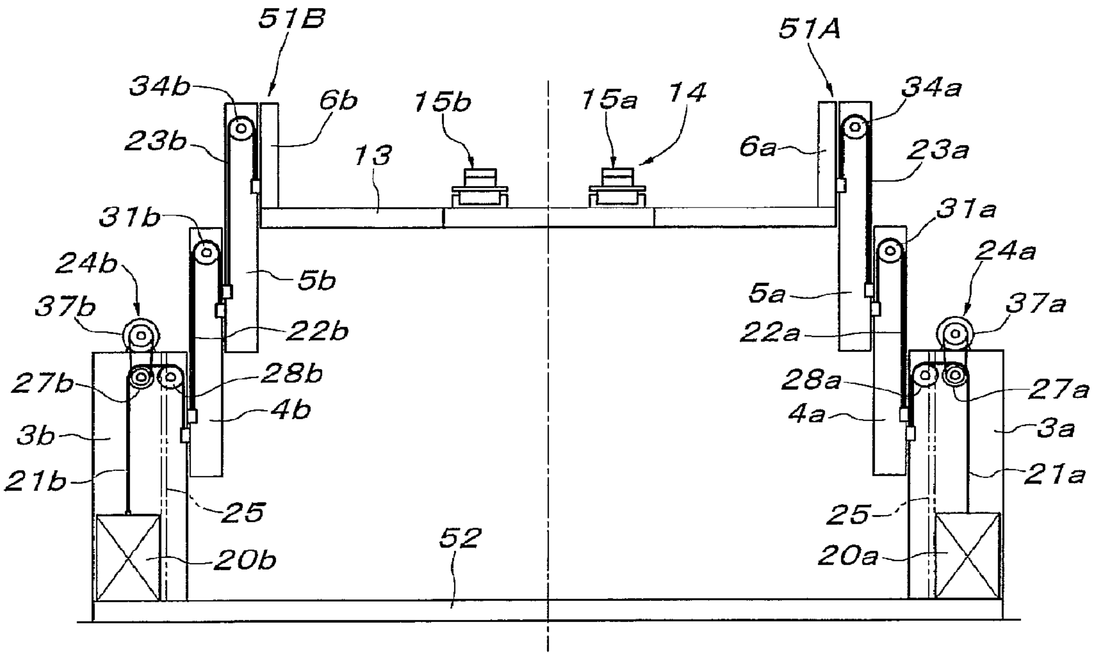
FIG. 8 is a front view showing the extending and contracting drive mechanism of the multistage extensible column in an extended state in the transfer device of the second embodiment.

According to the above-described action, as shown in FIG. 2 and FIG. 4, when the first mid-stage elevating column portions 4*a* and 4*b* rise to their upper limit positions with respect to the fixed column portion 3, that is, to the upper limit positions at which about halves of the whole heights of the first mid-stage elevating column portions 4*a* and 4*b* project upward from the fixed column portion 3, the second mid-stage elevating column portions 5*a* and 5*b* rise with respect to the first mid-stage elevating column portions 4*a* and 4*b* by the same distance as the rising distance of the first mid-stage elevating column portions 4*a* and 4*b* with respect to the fixed column portion 3, and further, the final-stage elevating portions 6*a* and 6*b* rise with respect to the second mid-stage elevating column portions 5*a* and 5*b* by the same rising distance as that of the first mid-stage elevating column portions 4*a* and 4*b* with respect to the fixed column portion 3, and finally, the transfer means 14 positioned at the lower ends of the final-stage elevating portions 6*a* and 6*b* rise to the upper limit positions near the upper ends of the first mid-stage elevating column portions 4*a* and 4*b* moved up with respect to the fixed column portion 3. When this multistage extensible column 1 is extended from a fully contracted state to a fully extended state, the weight of the counter weight 20 is applied upward to the mid-stage elevating column portions 4*a* through 5*b* and the final-stage elevating portions 6*a* and 6*b* via the winding transmission tools 21*a* and 21*b* through 23*a* and 23*b*, so that the load on the motor 37 of the elevating drive means 24 is sufficiently reduced.

Figure 3:
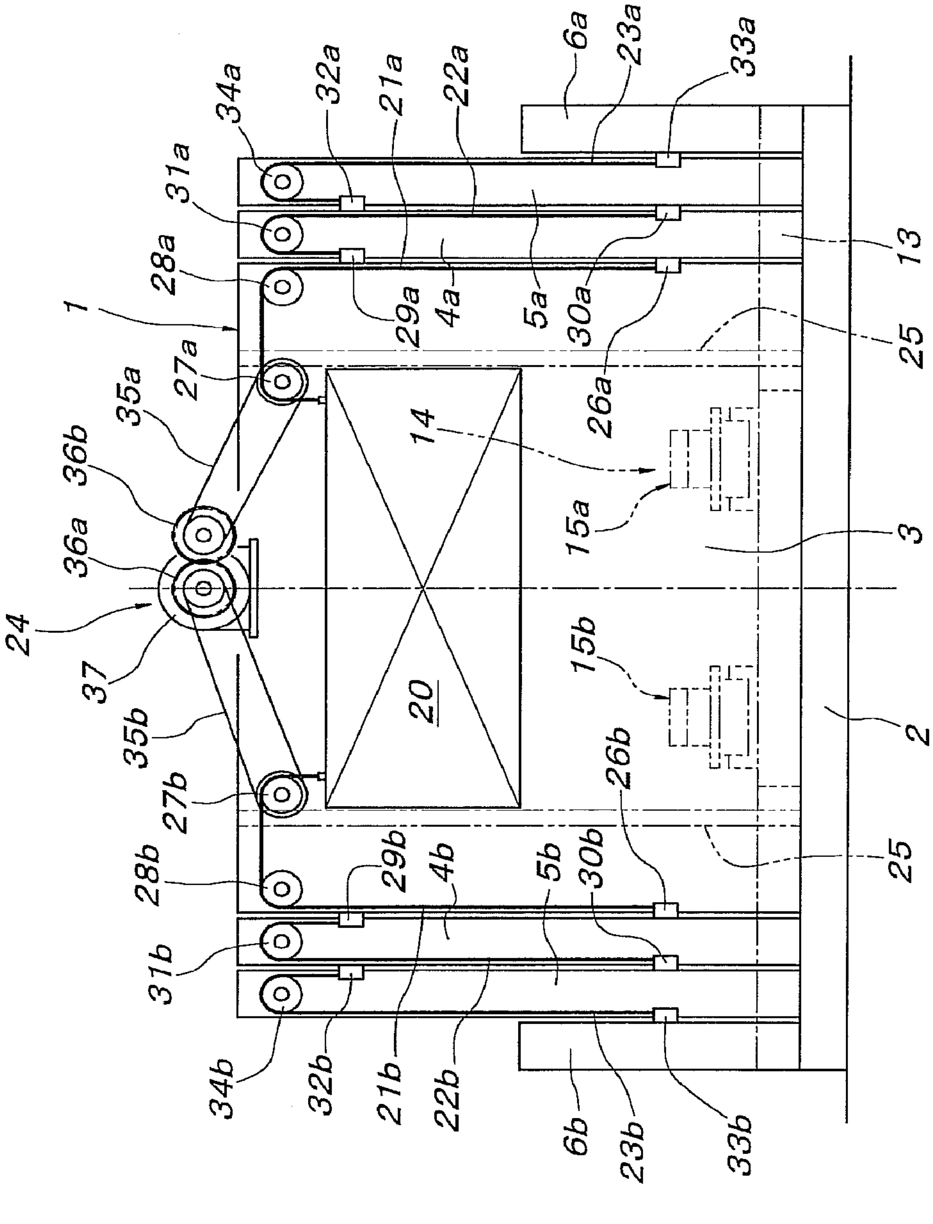
FIG. 3 is a front view showing an extending and contracting drive mechanism of a multistage extensible column in a contracted state in the transfer device of the first embodiment.

When the transfer means 14 at the upper limit position shown in FIG. 2 and FIG. 4 is lowered and returned to the original lower limit position shown in FIG. 1 and FIG. 3, the motor 37 of the elevating drive means 24 is actuated to rotate in reverse the turning guide wheels 27*a* and 27*b* around which the first winding transmission tools 21*a* and 21*b* are wound in a direction in which the first winding transmission tools 21*a* and 21*b* lift the counter weight 20, whereby due to gravity, the final-stage elevating portions 6*a* and 6*b* lower to the lower limit positions with respect to the second mid-stage elevating column portions 5*a* and 5*b*, the second mid-stage elevating column portions 5*a* and 5*b* lower to the lower limit positions with respect to the first mid-stage elevating column portions 4*a* and 4*b*, and further, the first mid-stage elevating column portions 4*a* and 4*b* lower to the lower limit positions with respect to the fixed column portion 3, and finally, the transfer means 14 at the upper limit position shown in FIG. 2 and FIG. 4 lowers and returns to the original lower limit position shown in FIG. 1 and FIG. 3.

The transfer means 14 which can thus be moved vertically between the lower limit position and the upper limit position by extending and contracting the multistage extensible column 1 between the fully contracted state and the fully extended state can be advanced and withdrawn horizontally between the withdrawing limit position shown in FIG. 1A and the advancing limit position shown in FIG. 2A, so that for example, as shown in FIG. 1A and FIG. 2A, the transfer device constituted as described above can be used as a means for transferring an object W between the floor surface conveyance line 39 using the conveyance carriage 38 that travels on a fixed traveling path on the floor surface and a load cradle 41 set on an upstairs slab 40 positioned just above the floor surface conveyance line 39.

Operations for scooping up and down the object W by forking operations performed by the combination of elevating movements of the transfer means 14 according to the extending and contracting movements of the multistage extensible column 1 and horizontal advancing and withdrawing movements between the withdrawing limit position and the advancing limit position of the running forks 15*a* and 15*b* of the transfer means 14 are conventionally known, so that description thereof will be omitted. In the example shown in FIG. 1A and FIG. 2A, an object W loaded on the conveyance carriage 38 stopped at a predetermined position of the floor surface conveyance line 39 is scooped sideward from the conveyance carriage 38 by an object scooping operation performed by combining the advancing movements of the running forks 15*a* and 15*b* of the transfer means 14 at the lower limit position to the advancing limit positions, the upward movement by a unit distance of the transfer means 14 from the lower limit position, the withdrawing movements of the running forks 15*a* and 15*b* to the withdrawing limit positions from the advancing limit positions, and thereafter, the transfer means 14 on which the object W is loaded is moved up to the upper limit position. Contrary to the object scooping operation, by an object unloading operation performed by combining the advancing and withdrawing movements of the running forks 15*a* and 15*b* and the elevating movement of the transfer means 14, the object W on the transfer means 14 can be unloaded onto the load cradle 41 of the upstairs slab 40. As a matter of course, on the contrary, it is also possible that the object W is transferred onto the conveyance carriage 38 stopped at a predetermined position of the floor surface conveyance line 39 from the load cradle 41 of the upstairs slab 40.

In the first embodiment described above, the withdrawing limit positions of the running forks 15*a* and 15*b* of the transfer means 14 are positions projecting sideward of the multistage extensible column 1, so that the transfer means 14 elevates while cantilevered on the final-stage elevating portions 6*a* and 6*b* even when the running forks 15*a* and 15*b* are at the withdrawing limit positions. Therefore, the object W which is conveyed vertically while supported on the transfer means 14 applies a great rotating (falling) moment to the horizontal joint member 13 supporting the transfer means 14, and eventually, to the multistage extensible column 1. The floor surface area occupied by the transfer device also increases.

Next, a second embodiment for solving this problem will be described with reference to FIG. 5 through FIG. 8. In this embodiment, two multistage extensible columns 51A and 51B are arranged parallel. In the multistage extensible columns 51A and 51B, on the sides facing each other of fixed column portions 3*a* and 3*b* stood on a common base 52, first mid-stage elevating column portions 4*a* and 4*b*, second mid-stage elevating column portions 5*a* and 5*b*, and final-stage elevating portions 6*a* and 6*b* are arranged in the same manner as in the aforementioned embodiment, and a horizontal joint member 13 is laid between lower ends of the pair of left and right final-stage elevating portions 6*a* and 6*b* positioned on the sides facing each other of the multistage extensible columns 51A and 51B, and on this horizontal joint member 13, a transfer means 14 is mounted.

In this embodiment, the running forks 15*a* and 15*b* at the withdrawing limit positions of the transfer means 14 can be positioned between the pair of left and right multistage extensible columns 51A and 51B (between the pair of left and right final-stage elevating portions 6*a* and 6*b*), so that the distance between the pair of left and right multistage extensible columns 51A and 51B (between the pair of final-stage elevating portions 6*a* and 6*b*) is set so that the object W supported by the running forks 15*a* and 15*b* can be drawn into the position between the pair of left and right multistage extensible columns 51A and 51B (between the pair of left and right final-stage elevating portions 6*a* and 6*b*). The constitutions of the elevating guide means of the mid-stage elevating column portions 4*a* through 5*b* and the final-stage elevating portions 6*a* and 6*b* are basically the same as in the aforementioned first embodiment, so that the same reference numerals are added in the drawing and description thereof will be omitted, however, the extending and contracting drive mechanism of the multistage extensible columns 51A and 51B is slightly different from that of the aforementioned first embodiment.

That is, in this second embodiment, for each of the multistage extensible columns 51A and 51B, the counter weight 20*a* or 20*b* and the elevating drive means 24*a* or 24*b* are provided. The counter weights 20*a* and 20*b* are installed in the fixed column portions 3*a* and 3*b* of the respective multistage extensible columns 51A and 51B and suspended by the first winding transmission tools 21*a* and 21*b* of the multistage extensible columns 51A and 51B, respectively. In the respective elevating drive means 24*a* and 24*b*, motors 37*a* and 37*b* interlocked with and joined to the turning guide wheels 27*a* and 27*b* around which the first winding transmission tools 21*a* and 21*b* in the respective multistage extensible columns 51A and 51B are wound are provided, respectively, and by these motors 37*a* and 37*b*, the turning guide wheels 27*a* and 27*b* are driven to rotate, respectively, and the motors 37*a* and 37*b* are actuated electrically in synchronization with each other so that the first mid-stage elevating column portions 4*a* and 4*b* of the multistage extensible columns 51A and 51B can be driven and elevated in synchronization with each other. As a matter of course, it is also allowed that the turning guide wheels 27*a* and 27*b* of the multistage extensible columns 51A and 51B are mechanically interlocked with and joined to each other by using an interlocking shaft supported horizontally along the common base 52 and by using this interlocking means, the turning guide wheels 27*a* and 27*b* are driven to rotate by one motor.

Figure 9:
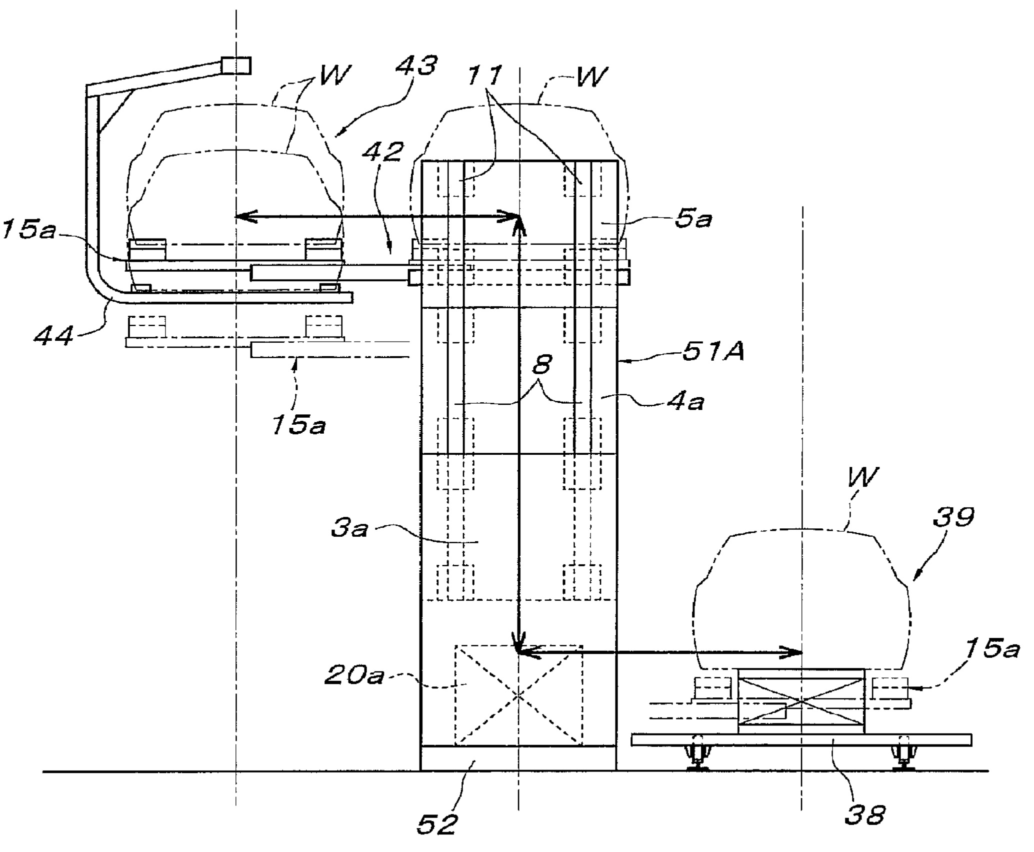
FIG. 9 is a side view showing a transfer device of a third embodiment.

Further, as a transfer means, a type which can advance the running forks 15*a* and 15*b* forward and rearward by setting its withdrawing limit position as a home position is known, and as in the case of the third embodiment shown in FIG. 9, when the second embodiment is constituted by using this type of transfer means 42, the object W can be transferred to both front and rear sides with respect to the elevating conveyance position between the multistage extensible columns 51A and 51B, so that for example, as in the case of the third embodiment shown in FIG. 9, when the floor surface conveyance line 39 and the overhead conveyor line 43 are separated horizontally in a plan view, it is possible that the transfer device is installed at an intermediate position between the floor surface conveyance line 39 and the overhead conveyor line 43 in the plan view so that the object W can be transferred between the conveyance carriage 38 stopped at a predetermined position on the floor surface conveyance line 39 and an object suspending conveyance hanger 44 stopped at a predetermined position on the overhead conveyor line 43.

Figure 10A:
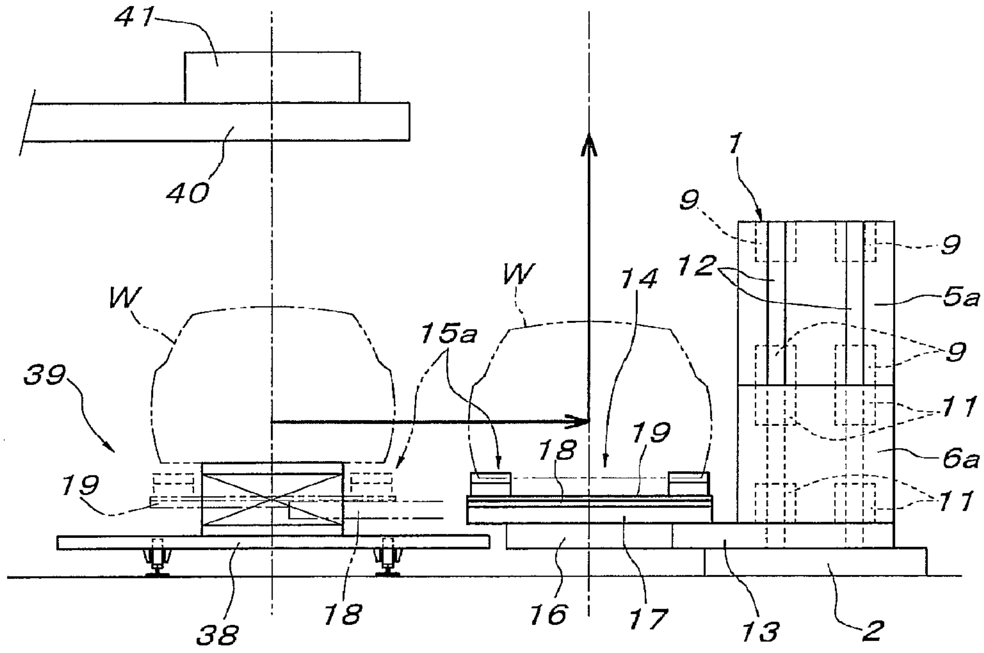
FIG. 10A is a side view showing a state that an object is transferred onto or from a conveyance carriage of a floor surface conveyance line in a transfer device of a fourth embodiment.

Next, a fourth embodiment of the second aspect of the invention carried out as a transfer device will be described with reference to the accompanying FIG. 10 through FIG. 12. The transfer device of this fourth embodiment has the same constitution except for the extending and contracting drive mechanism of the multistage extensible column 1 as that of the transfer device of the above-described first embodiment, so that the same reference numerals are attached and description thereof will be omitted.

The extending and contracting drive mechanism of the multistage extensible column 1 will be described. As shown in FIG. 12, elevating drive means 120 which drive and elevate the first mid-stage elevating column portions 4*a* and 4*b* with respect to the fixed column portion 3 are provided, and the first mid-stage elevating column portions 4*a* and 4*b* and the second mid-stage elevating column portions 5*a* and 5*b* are provided with pulley-wound suspending chains 121*a*, 121*b*, 122*a*, and 122*b*. The elevating drive means 120 include endless winding suspending chains 125*a* and 125*b* which are hung vertically by a pair of upper and lower guide wheels 123*a* or 123*b* and 124*a* or 124*b* and latched at one point on the first mid-stage elevating column portions 4*a* and 4*b* via latching tools 126*a* and 126*b*, and a driving device 127 which drives to rotate in an interlocking manner these endless winding suspending chains 125*a* and 125*b*. The driving device 127 includes a motor 128 and gear trains 129*a* and 129*b* and winding transmission tools 130*a* and 130*b* for transmitting the rotation of the output shaft of the motor 128 to the upper guide wheels 23*a* and 24*a* of the endless winding suspending chains 25*a* and 25*b*. As the endless winding suspending chains 125*a* and 125*b*, chains or wire ropes are used, and as the winding transmission tools 130*a* and 130*b*, chains or timing belts are used.

As the elevating drive means 120, instead of the endless winding suspending chains 125*a* and 125*b*, other various methods using rack pinion gears or electric screw shafts can be used as long as they can drive and elevate the pair of left and right first mid-stage elevating column portions 4*a* and 4*b* in synchronization with each other.

The pulley-wound suspending chains 121*a* and 121*b* provided in the first mid-stage elevating columns 4*a* and 4*b* are laid in a pulley-wound manner around the guide wheels 131*a* and 131*b* axially supported on the upper ends of the first mid-stage elevating column portions 4*a* and 4*b*, and one ends thereof are latched on positions near the upper end of the fixed column portion 3 via latching tools 132*a* and 132*b*, and the other ends are latched on positions near the lower ends of the second mid-stage elevating column portions 5*a* and 5*b* via latching tools 133*a* and 133*b*. The pulley-wound suspending chains 122*a* and 122*b* provided in the second mid-stage elevating column portions 5*a* and 5*b* are laid in a pulley-wound manner around the guide wheels 134*a* and 134*b* axially supported on the upper ends of the second mid-stage elevating column portions 5*a* and 5*b*, one ends thereof are latched on the positions near the upper ends of the first mid-stage elevating column portions 4*a* and 4*b* via latching tools 135*a* and 135*b*, and the other ends thereof are latched on the final-stage elevating portions 5*a* and 5*b* via latching tools 136*a* and 136*b*. As these pulley-wound suspending chains 121*a*, 121*b*, 122*a*, and 122*b*, chains or wire ropes are used.

On both left and right sides of the fixed column portion 3, fluid pressure cylinders 137A and 137B which urge the first mid-stage elevating column portions 4*a* and 4*b* upward are disposed, and in the first mid-stage elevating column portions 4*a* and 4*b*, fluid pressure cylinders 138A and 138B which urge the second mid-stage elevating column portions 5*a* and 5*b* upward are disposed, and in the second mid-stage elevating column portions 5*a* and 5*b*, fluid pressure cylinders 139A and 139B which urge the final-stage elevating portions 6*a* and 6*b* upward are disposed.

The upper ends of the cylinder main bodies 137*a* of the fluid pressure cylinder 137A and 137B are joined to brackets 140*a* and 140*b* projecting from positions near the upper ends of both left and right sides of the fixed column portion 3 via support shafts 141*a* and 141*b*, and free ends of piston rods 137*b* projecting from the lower ends of the cylinder main bodies 137*a* are connected to positions near the lower ends of the first mid-stage elevating column portions 4*a* and 4*b* via the support shafts 142*a* and 142*b*. The upper ends of cylinder main bodies 138*a* of the fluid pressure cylinders 138A and 138B are joined to brackets 143*a* and 143*b* projecting from positions near the upper ends of the first mid-stage elevating column portions 4*a* and 4*b* via support shafts 144*a* and 144*b*, and free ends of piston rods 138*b* projecting from lower ends of the cylinder main bodies 138*a* are connected to positions near the lower ends of the second mid-stage elevating column portions 5*a* and 5*b* via support shafts 145*a* and 145*b*. Then, upper ends of cylinder main bodies 139*a* of the fluid pressure cylinders 139A and 139B are joined to brackets 146*a* and 146*b* projecting from positions near the upper ends of the second mid-stage elevating column portions 5*a* and 5*b* via support shafts 147*a* and 147*b*, and free ends of piston rods 139*b* projecting from the lower ends of the cylinder main bodies 139*a* are connected to positions near the lower ends of the final-stage elevating portions 6*a* and 6*b*.

Figure 14:
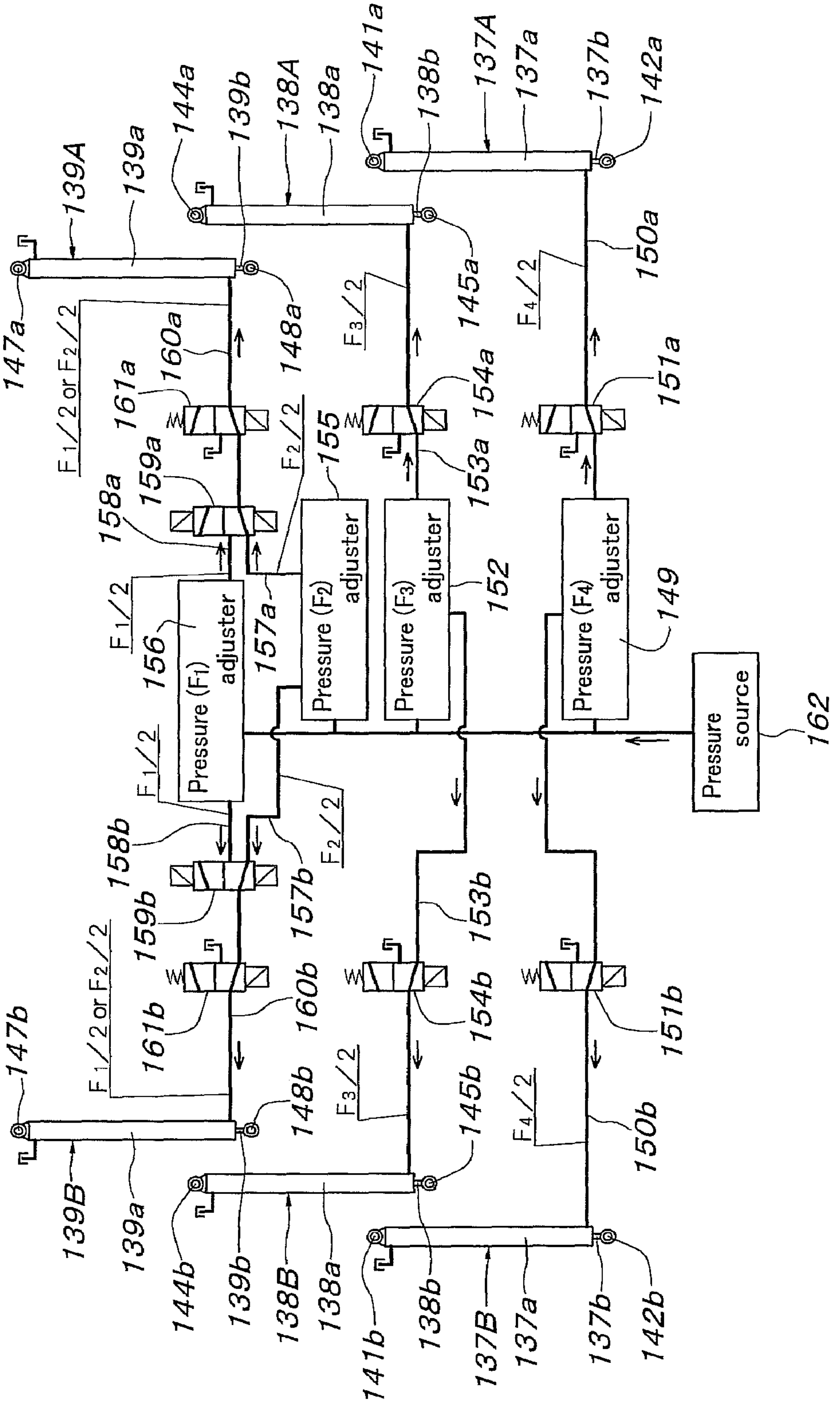
FIG. 14 is a drawing describing a piping system of a balancer mechanism of the multistage extensible column in the transfer device of the fourth embodiment.
Figure 15B:
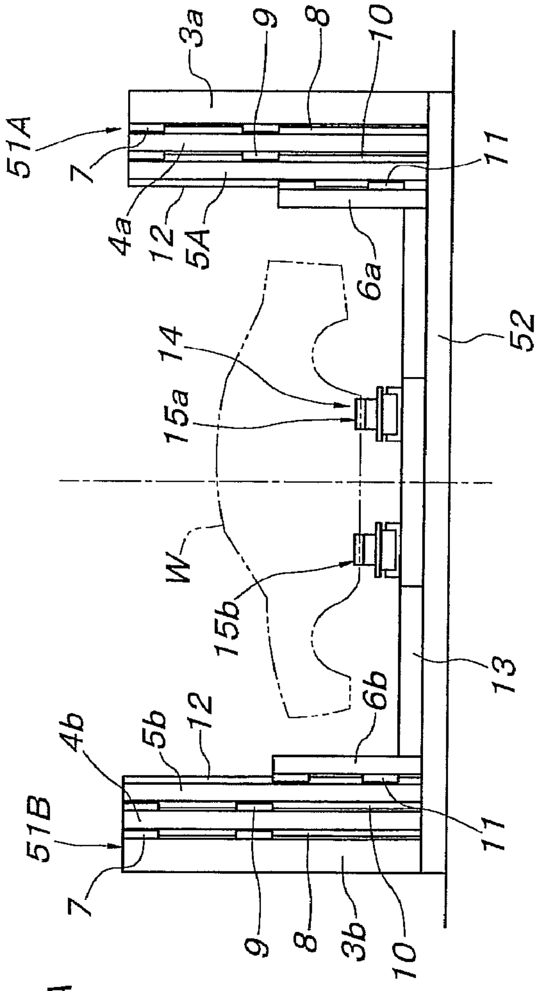
FIG. 15B is a front view of the transfer device in the same state.
Figure 15A:
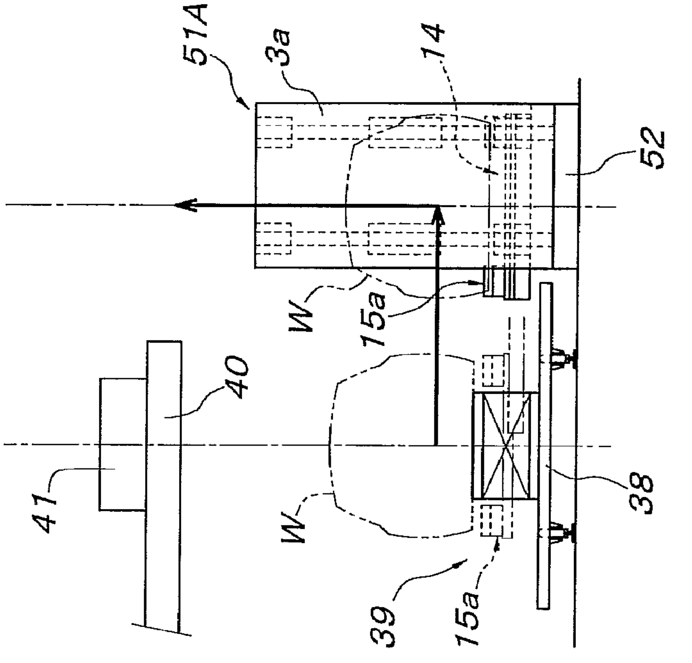
FIG. 15A is a side view showing a state that an object is transferred onto or from a conveyance carriage of a floor surface conveyance line in a transfer device of a fifth embodiment.
Figure 16B:
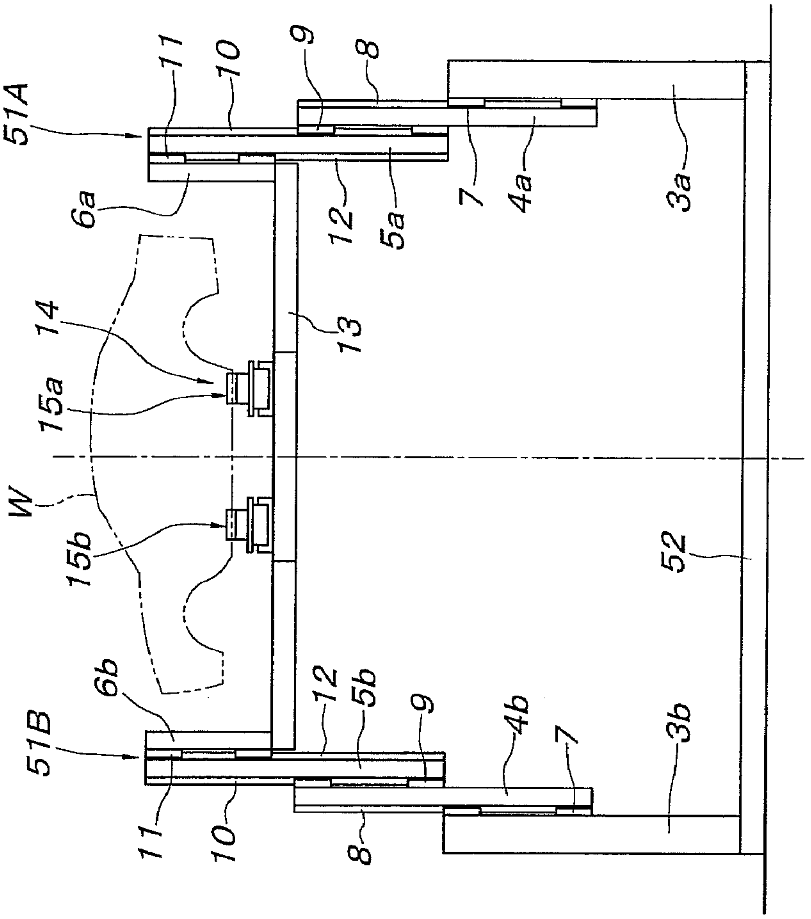
FIG. 16B is a front view of the transfer device in the same state.
Figure 16A:
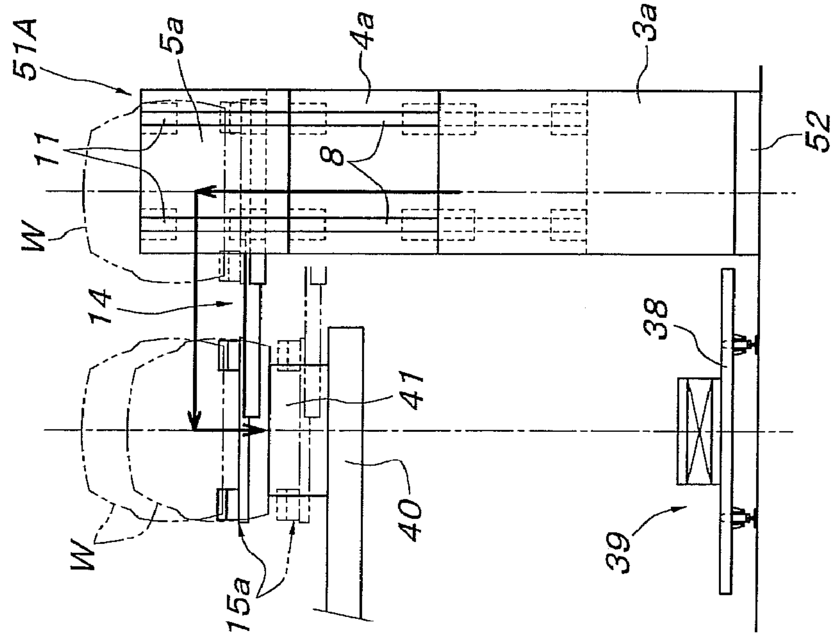
FIG. 16A is a side view showing a state that an object is transferred onto or from a load cradle of an upstairs slab in the transfer device of the fifth embodiment.
Figure 17:
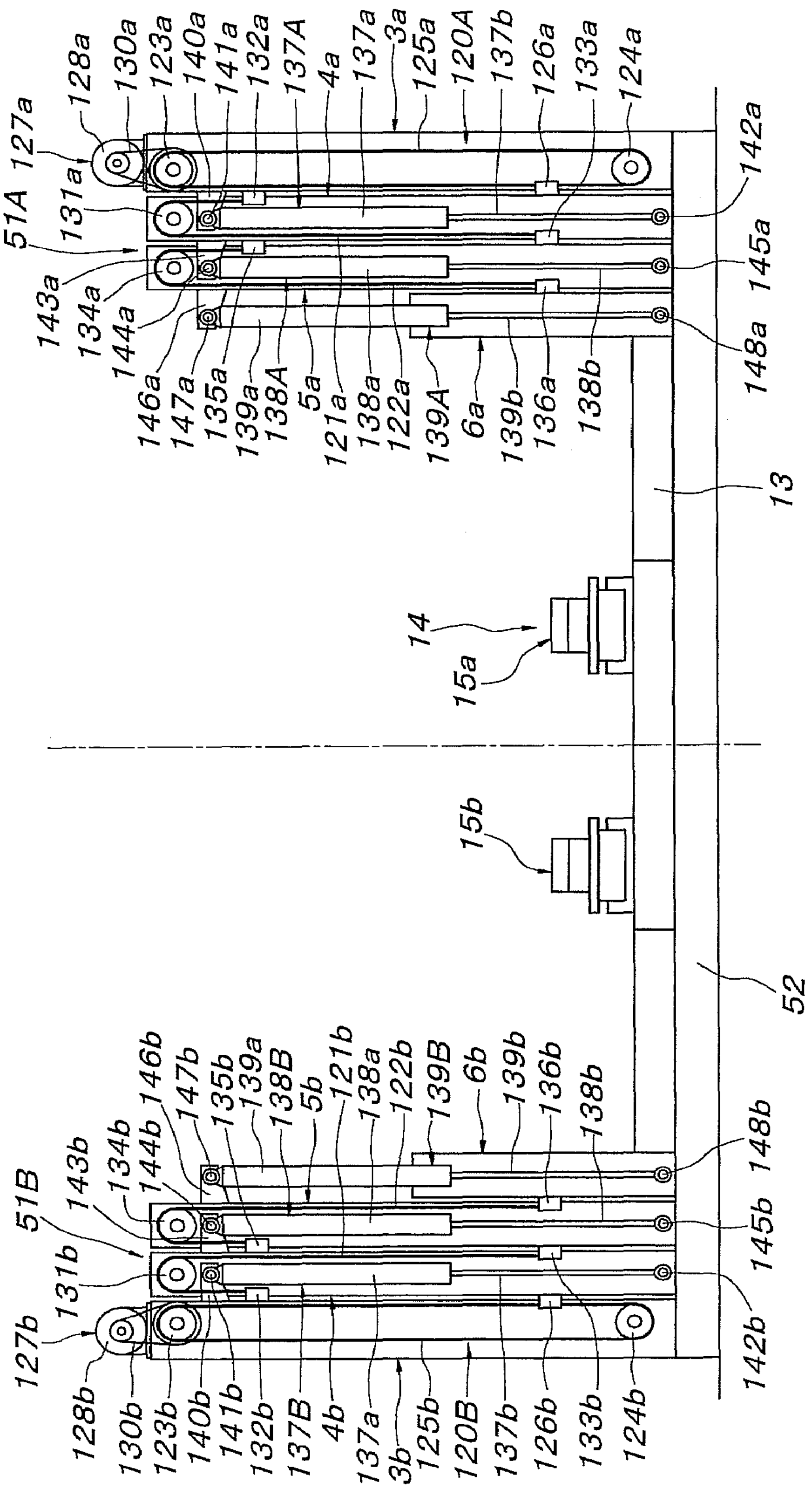
FIG. 17 is a front view showing an extending and contracting drive mechanism of a multistage extensible column in a contracted state in the transfer device of the fifth embodiment.
Figure 18:
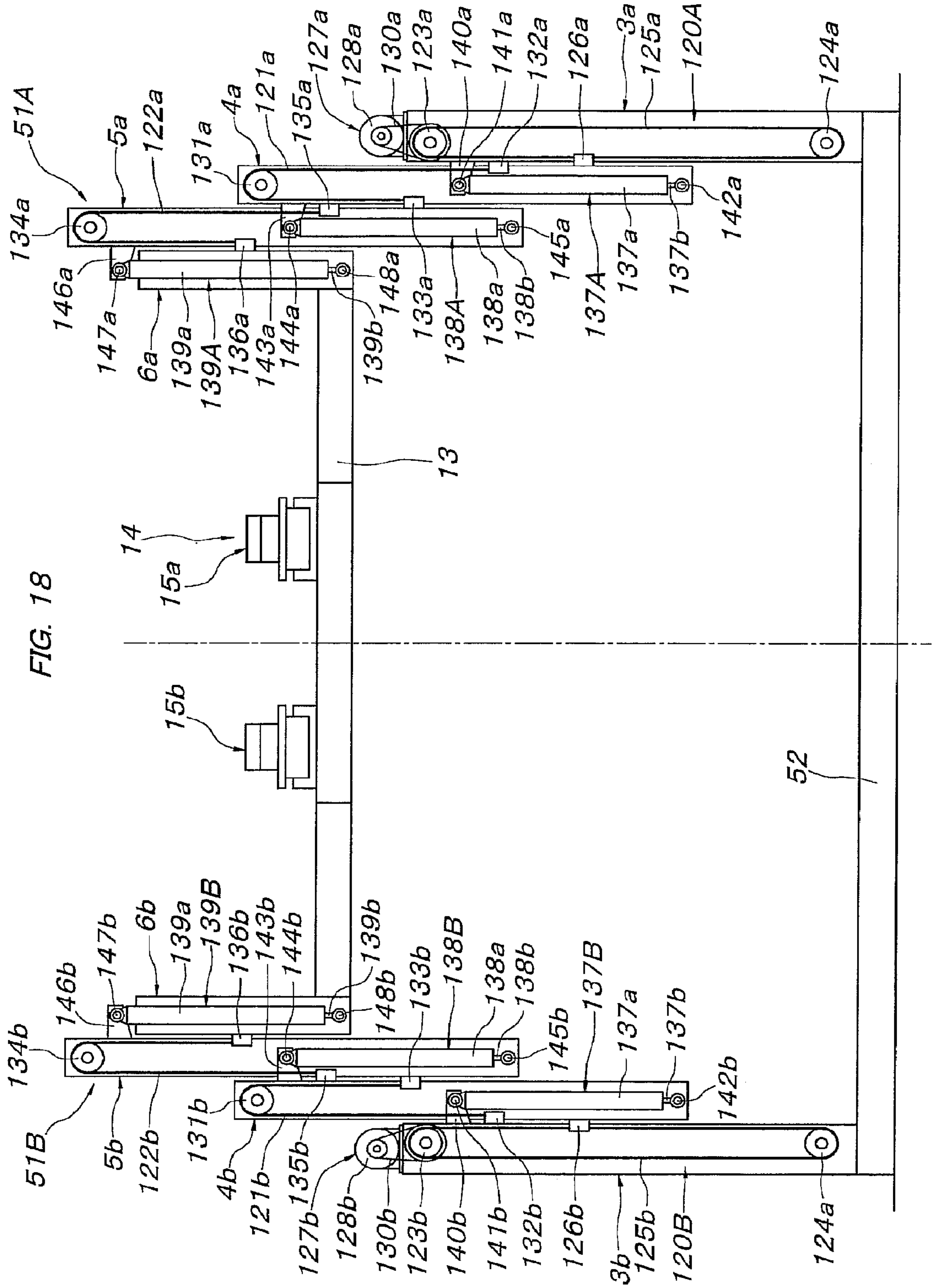
FIG. 18 is a front view showing the extending and contracting drive mechanism of the multistage extensible column in an extended state in the transfer device of the fifth embodiment.

As shown in FIG. 14, to the advancing sides of the piston rods 137*a* of the cylinder main bodies 137*a* of the fluid pressure cylinders 137A and 137B which urge the first mid-stage elevating column portions 4*a* and 4*b* upward, fluid pressure supply pipes 150*a* and 150*b* from a pressure adjuster 149 are connected via pressure supply/open switching valves 151*a* and 151*b*, and to the advancing sides of the piston rods 138*b* of the cylinder main bodies 138*a* of the fluid pressure cylinders 138A and 138B which urge the second mid-stage elevating column portions 5*a* and 5*b* upward, fluid pressure supply pipes 153*a* and 153*b* from a pressure adjuster 152 are connected via pressure supply/open switching valves 154*a* and 154*b*. For fluid pressure cylinders 139A and 139B which urge the final-stage elevating portions 6*a* and 6*b* upward, two pressure adjusters 155 and 156 are provided in parallel, and fluid pressure supply pipes 157*a* and 157*b* and 158*a* and 158*b* from the pressure adjusters 155 and 156 are connected to the fluid pressure supply pipes 160*a* and 160*b*, respectively, via switching valves 159*a* and 159*b*, and these fluid pressure supply pipes 160*a* and 160*b* are connected to the advancing sides of the piston rods 139*b* of the cylinder main bodies 139*a* via pressure supply/open switching valves 161*a* and 161*b*.

The pressure adjusters 149, 152, 155, and 156 are connected to a pressure fluid (for example, compressed air) supply source 162, and the fluid pressure (for example, air pressure, the same applies to the following description) F4 to be supplied to the fluid pressure cylinders 137A and 1378 from the pressure adjuster 149 is set to be substantially balanced with the total weight W3 of the first mid-stage elevating column portions 4*a* and 4*b*, the fluid pressure F3 to be supplied to the fluid pressure cylinders 138A and 138B from the pressure adjuster 152 is set to be substantially balanced with the total weight W2 of the second mid-stage elevating column portions 5*a* and 5*b*, the fluid pressure F2 to be supplied to the fluid pressure cylinders 139A and 139B from the pressure adjuster 155 is set to be substantially balanced with the total weight W1 of the final-stage elevating portions 6*a* and 6*b*, and the fluid pressure F1 to be supplied to the fluid pressure cylinders 139A and 139B from the pressure adjuster 156 is set to be substantially balanced with the sum (W0+W1) of the total weight W1 of the final-stage elevating portions 6*a* and 6*b* and the weight W0 of the object W with the fixed weight to be loaded on the transfer means 14 (object support). In this embodiment, the fluid pressure cylinders 137A through 1398 are arranged in pairs of left and right with respect to one elevating member, so that in actuality, the fluid pressures to be supplied to the respective fluid pressure cylinders 137A through 139B are halves of F1 through F4 as shown in FIG. 14.

Figure 10B:
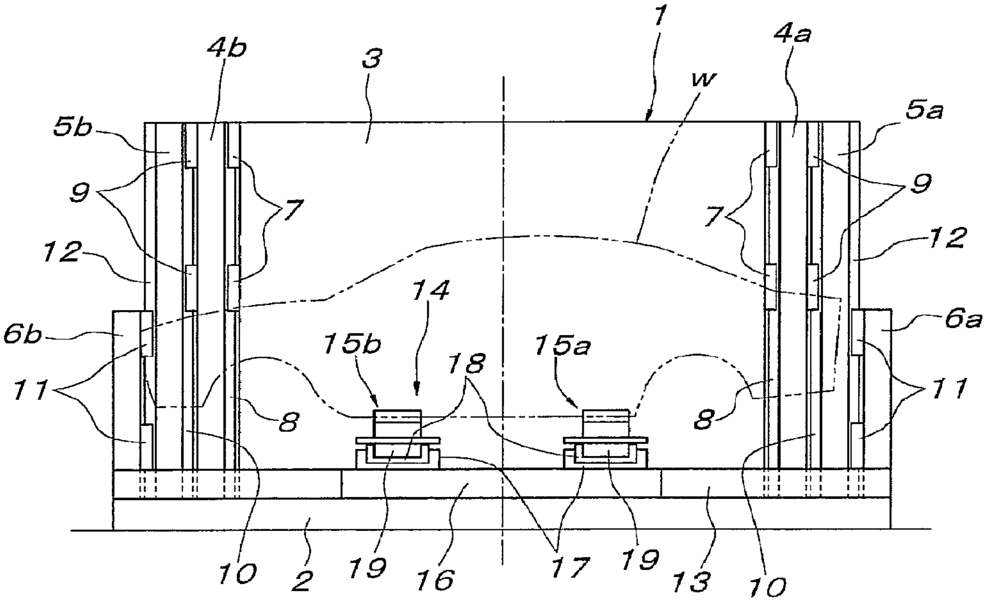
FIG. 10B is a front view of the transfer device in the same state.
Figures 11A, 11B:
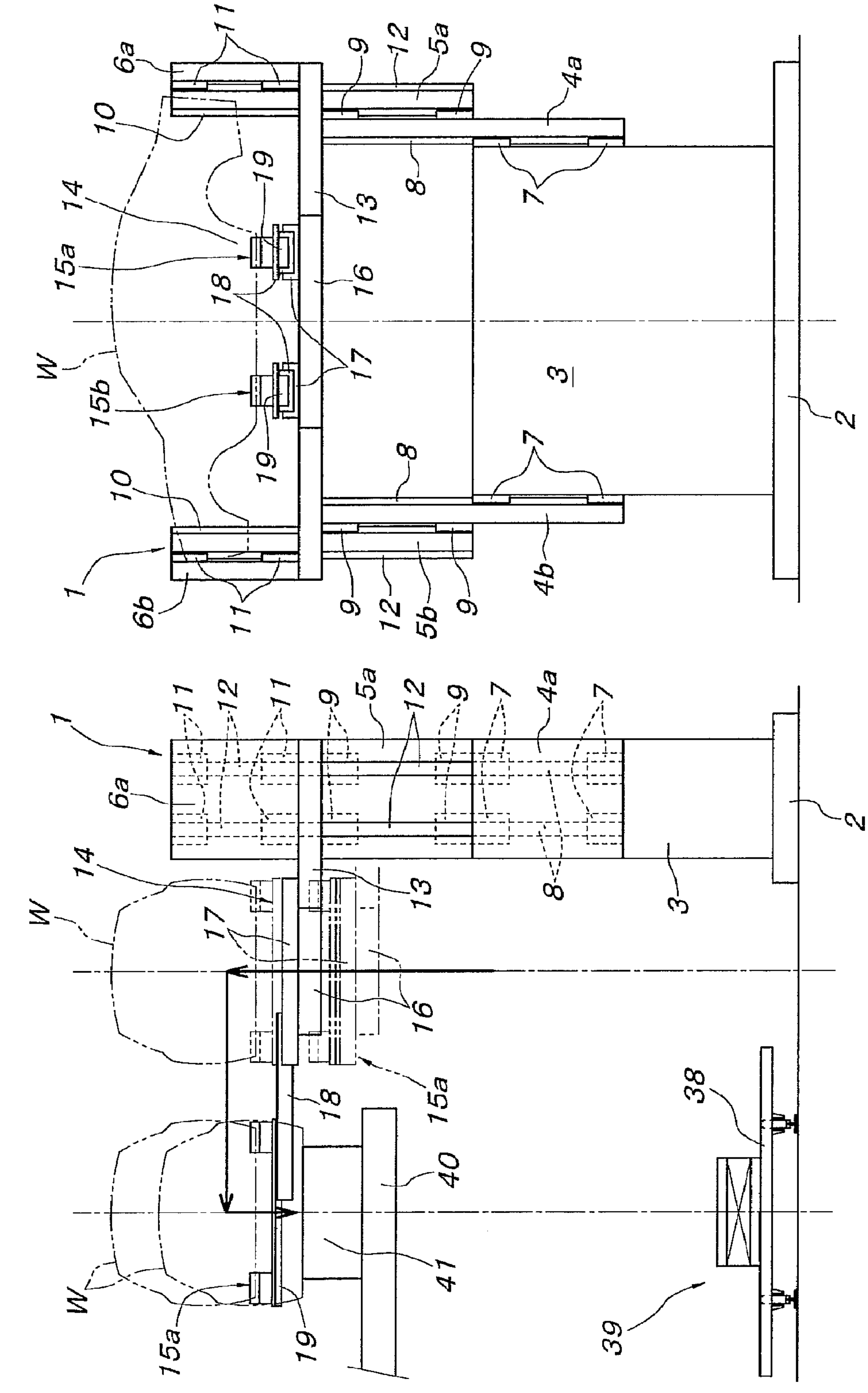
FIG. 11A is a side view showing a state that an object is transferred onto or from a load cradle of an upstairs slab in the transfer device of the fourth embodiment.
FIG. 11B is a front view of the transfer device in the same state.
Figure 12:
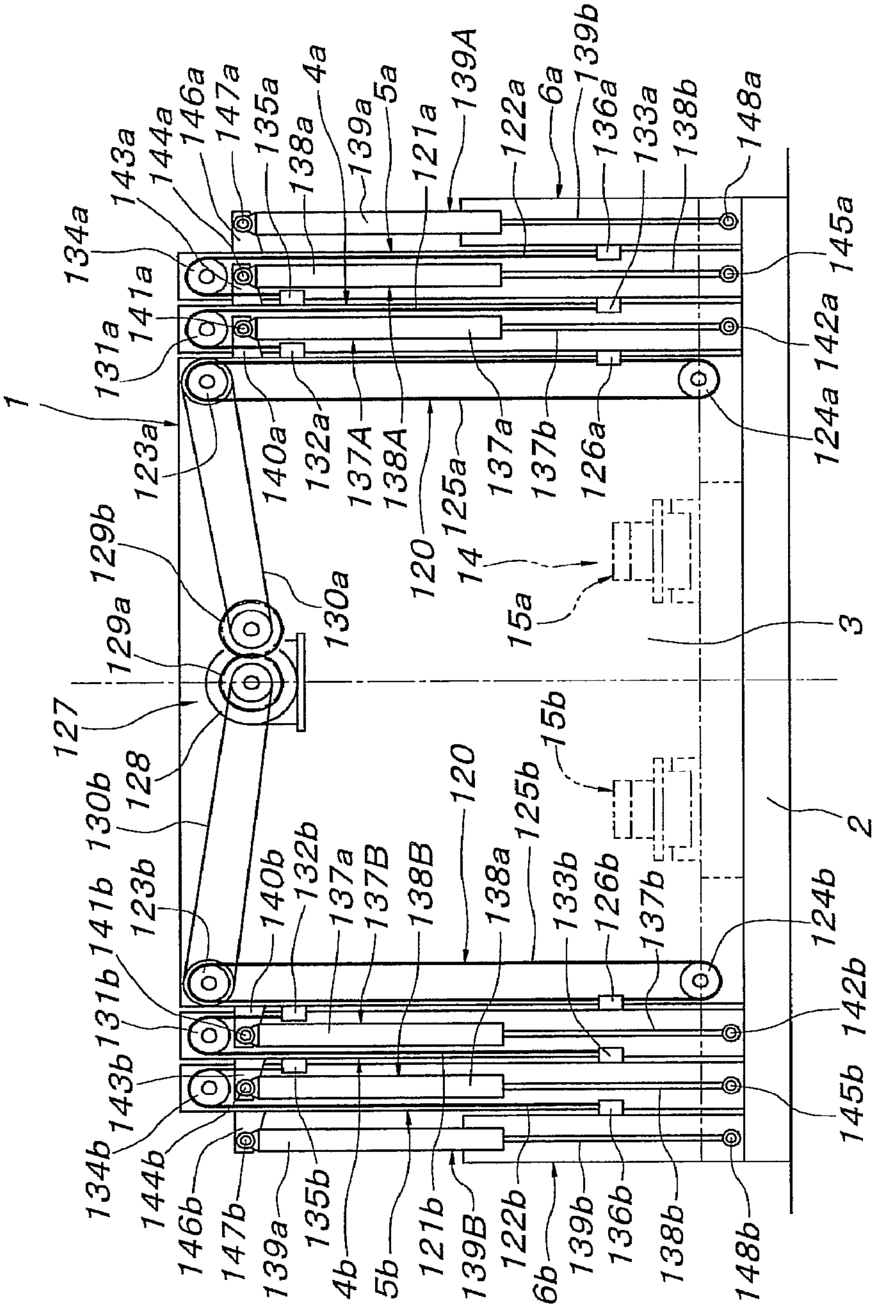
FIG. 12 is a front view showing an extending and contracting drive mechanism of a multistage extensible column in a contracted state in the transfer device of the fourth embodiment.

In the above-described constitution, as shown in FIG. 10 and FIG. 12, when the multistage extensible column 1 is in a contracted state and the mid-stage elevating column portions 4*a* through 5*b* and the final-stage elevating portions 6*a* and 6*b* are at their lower limit positions, the transfer means 14 is at the lower limit position closest to the floor surface, and piston rods 137*b* through 139*b* of the fluid pressure cylinders 137A through 139B are in a fully extended state. In this state, it is preferable that the mid-stage elevating column portions 4*a* through 5*b* and the final-stage elevating portions 6*a* and 6*b* are supported by receiving tools provided on the base 2 side or on the mid-stage elevating column portions 4*a* through 5*b* and the fixed column portion 3 just below the mid-stage elevating column portions 4*a* through 5*b* and the final-stage elevating portions 6*a* and 6*b* so that no load is applied to the endless winding suspending chains 125*a* and 125*b* and the pulley-wound suspending chains 121*a* through 122*b* of the elevating drive means 120. With this constitution, when the multistage extensible column 1 is in a contracted state, the pressure supply/open switching valves 151*a* and 151*b*, 154*a* and 154*b*, and 161*a* and 161*b* shown in FIG. 14 are switched to the open side to cut-off the pressure fluid supply to the fluid pressure cylinders 137A through 139B.

Then, when the motor 128 of the driving device 127 of the elevating drive means 120 is actuated from the contracted state of the multistage extensible column 1 to drive and rotate the endless winding suspending chains 125*a* and 125*b* in a direction of lifting the first mid-stage elevating column portions 4*a* and 4*b*, according to upward movements of the first mid-stage elevating column portions 4*a* and 4*b* with respect to the fixed column portion 3, the pulley-wound suspending chains 121*a* and 121*b* of the first mid-stage elevating column portions 4*a* and 4*b* are pulled relatively downward by the latching tools 132*a* and 132*b* on the fixed column portion 3 side to lift the second mid-stage elevating column portions 5*a* and 5*b* with respect to the lifted first mid-stage elevating column portions 4*a* and 4*b* via the latching tools 133*a* and 133*b*. Further, according to the upward movements of the second mid-stage elevating column portions 5*a* and 5*b* with respect to the first mid-stage elevating column portions 4*a* and 4*b*, the pulley-wound suspending chains 122*a* and 122*b* of the second mid-stage elevating column portions 5*a* and 5*b* are pulled relatively downward by the latching tools 135*a* and 135*b* on the sides of the first mid-stage elevating column portions 4*a* and 4*b* sides to lift the final-stage elevating portions 6*a* and 6*b* with respect to the lifted first mid-stage elevating column portions 4*a* and 4*b* via the latching tools 136*a* and 136*b*.

Figure 13:
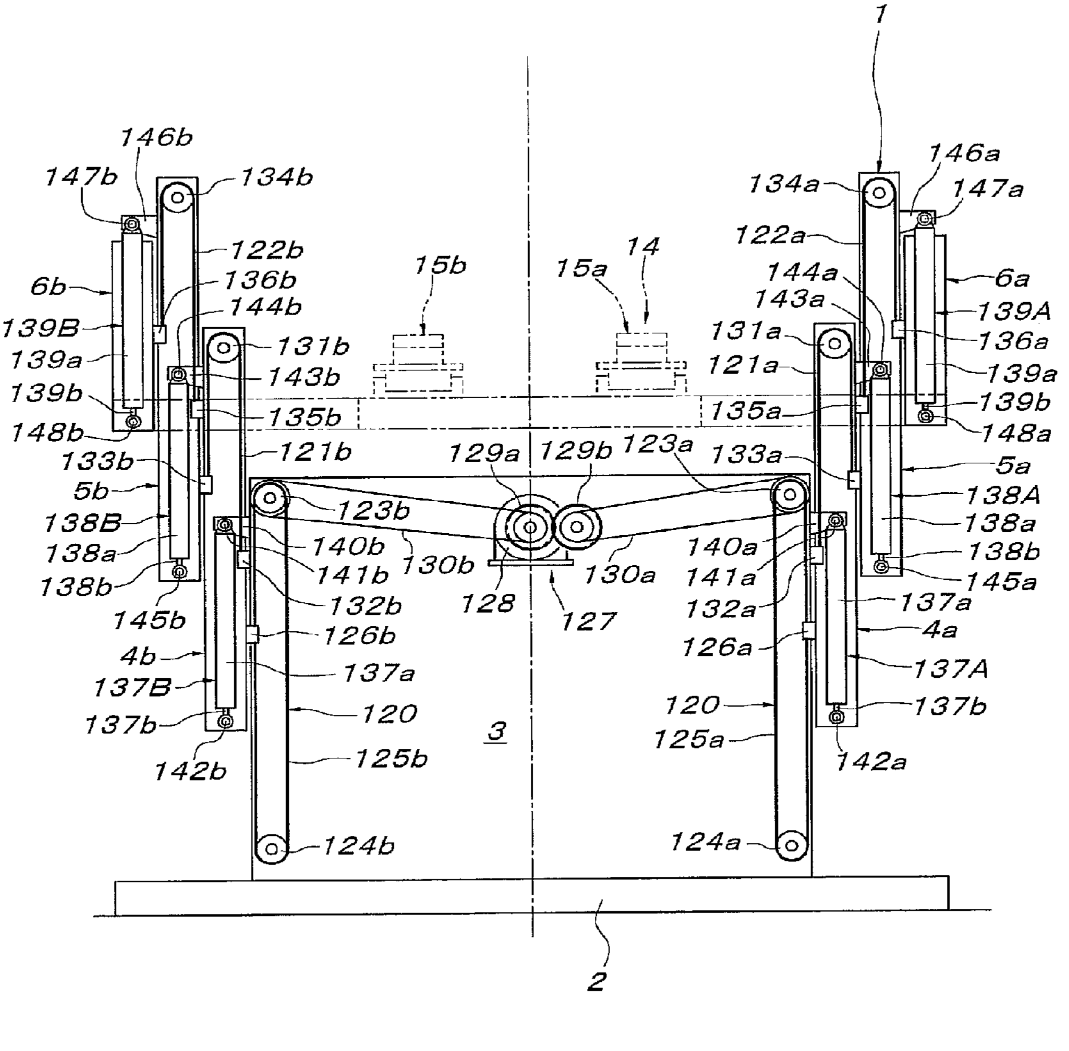
FIG. 13 is a front view showing the extending and contracting drive mechanism of the multistage extensible column in an extended state in the transfer device of the fourth embodiment.

According to the above-described working, as shown in FIG. 11 and FIG. 13, when the first mid-stage elevating column portions 4*a* and 4*b* rise to the upper limit positions with respect to the fixed column portion 3, the second mid-stage elevating column portions 5*a* and 5*b* rise by the same distance as the rising distance of the first mid-stage elevating column portions 4*a* and 4*b* with respect to the fixed column portion 3, and further, the final-stage elevating portions 6*a* and 6*b* rise with respect to the second mid-stage elevating column portions 5*a* and 5*b* by the same distance as the rising distance of the first mid-stage elevating column portions 4*a* and 4*b* with respect to the fixed column portion 3, and finally, the final-stage elevating portions 6*a* and 6*b* rise to the upper limit positions.

When the multistage extensible column 1 is thus extended from the fully contracted state into the fully extended state, if the fluid pressure cylinders 137A through 139B which urge the mid-stage elevating column portions 4*a* through 5*b* and the final-stage elevating portions 6*a* and 6*b* upward are absent, to the first mid-stage elevating column portions 4*a* and 4*b*, the following gravity:

$$f_1=3W_1+2W_2+W_3$$

is applied when the object W is not loaded on the transfer means 14, and the following gravity:

$$f_2=3W_0+3W_1+2W_2+W_3$$

is applied when the object W is loaded on the transfer means 14, provided that:

$W_0$=weight of object W $W_1$=total weight of final-stage elevating portions 6*a* and 6*b*

$W_2$=total weight of second mid-stage elevating column portions 5*a* and 5*b*

$W_3$=total weight of first mid-stage elevating column portions 4*a* and 4*b*.

Therefore, generally, the first mid-stage elevating column portions 4*a* and 4*b* are urged upward with respect to the fixed column portion 3 by a balance weight with the weight $f_1$ or $f_2$, however, with the above-described constitution of the present invention, when the multistage extensible column 1 is extended, the pressure supply/open switching valves 151*a* and 151*b*, 154*a* and 154*b*, and 161*a* and 161*b* are switched to the pressure supply side, and further, when the transfer means 14 is empty, the switching valves 159*a* and 159*b* are switched to the pressure adjuster 155 side to supply the fluid pressure $F_2$ to the fluid pressure cylinders 139A and 139B, and when the object W is loaded on the transfer means 14, the switching valves 159*a* and 159*b* are switched to the pressure adjuster 156 side to supply the fluid pressure $F_1$ to the fluid pressure cylinders 139A and 139B, whereby the following relationships:

$$F_1=W_0+W_1$$

$$F_2=W_1$$

$$F_3=W_2$$

$$F_4=W_3$$

are satisfied as described above, and therefore, in both of the cases where the object W is loaded on and not loaded on the transfer means 14, the whole elevating section including the object W is made weightless theoretically, so that the endless winding suspending chains 125*a* and 125*b* of the elevating drive means 150 are driven to rotate by a small driving force just enough to overcome the friction resistance of the relative elevating portions and can extend the multistage extensible column 1 from the fully contracted state into the fully extended state.

When a plurality of types of objects W with varied weights W0 are handled, a plurality of pressure adjusters 156 which can supply fluid pressures F1=W0+W1 corresponding to the weights W0 of the object types and switching valves for selectively using the pressure adjusters 156 may be used together. In the above-described constitution, the pressure adjuster 155 to be used when the transfer means 14 is empty and the pressure adjuster 156 to be used when the object W is loaded on the transfer means 14 are selectively used, however, it is also allowed that one variable pressure adjuster which can adjust the fluid pressure to be outputted according to the loading weight is used.

To lower and return the transfer means 14 at the upper limit position shown in FIG. 11 and FIG. 13 to the original lower limit position shown in FIG. 10 and FIG. 12, the motor 128 of the driving device 127 of the elevating drive means 120 is actuated in reverse to rotate the endless winding suspending chains 125*a* and 125*b* in a reverse direction of pulling-down the first mid-stage elevating column portions 4*a* and 4*b*, whereby the final-stage elevating portions 6*a* and 6*b* lower to the lower limit positions with respect to the second mid-stage elevating column portions 5*a* and 5*b*, the second mid-stage elevating column portions 5*a* and 5*b* lower to the lower limit positions with respect to the first mid-stage elevating column portions 4*a* and 4*b*, and further, the first mid-stage elevating column portions 4*a* and 4*b* lower to the lower limit positions with respect to the fixed column portion 3, and finally, the transfer means 14 at the upper limit position shown in FIG. 11 and FIG. 13 lowers and returns to the original lower limit position shown in FIG. 10 and FIG. 12.

By thus extending and contracting the multistage extensible column 1 between the fully contracted state and the fully extended state, similar to the transfer means 14 of the first embodiment described above, for example, as shown in FIG. 10A and FIG. 11A, the transfer means 14 capable of being moved vertically between the lower limit position and the upper limit position can be used as a means for transferring an object W between the floor surface conveyance line 39 using the conveyance carriage 38 that travels on a fixed traveling path on the floor surface and a load cradle 41 set on the upstairs slab 40 positioned just above the floor surface conveyance line 39. The operations for scooping up and down the object W between the conveyance carriage 38 and the transfer means 14 and the operations for scooping up and down the object W between the transfer means 14 and the load cradle 41 are performed in the same manner as those of the transfer device of the first embodiment described above.

The elevating conveyance device (transfer device) based on the second aspect of the invention can also be carried out according to the same embodiment as the aforementioned second embodiment shown in FIG. 5 through FIG. 8. That is, the transfer device of the fifth embodiment shown in FIG. 15 through FIG. 18 is the same in constitution as the transfer device of the aforementioned second embodiment except for the extending and contracting drive mechanism of the multistage extensible column 1, so that the same reference numerals are attached to the same components and description thereof is omitted.

In particular, in this fifth embodiment, the elevating drive means 120A and 120B are provided for the multistage extensible columns 51A and 51B, respectively. These elevating drive means 120A and 120B include endless winding suspending chains 125*a* and 125*b* which drive and elevate the first mid-stage elevating column portions 4*a* and 4*b* of the respective multistage extensible columns 51A and 51B, and driving devices 127*a* and 127*b* which drive these endless winding suspending chains 125*a* and 125*b*, respectively, and as the driving devices 127*a* and 127*b*, two motors 128*a* and 128*b* which are interlocked with and joined to the respective upper guide wheels 123*a* and 123*b* of the endless winding suspending chains 125*a* and 125*b* via the winding transmission tools 130*a* and 130*b* are provided, and both motors 128*a* and 128*b* are electrically actuated in synchronization with each other so as to drive and elevate the first mid-stage elevating column portions 4*a* and 4*b* of the multistage extensible columns 51A and 51B in synchronization with each other. As a matter of course, it is also allowed that the upper guide wheels 123*a* and 123*b* of the endless winding suspending chains 125*a* and 125*b* in both multistage extensible columns 51A and 51B are mechanically interlocked with and joined to each other by using an interlocking shaft supported horizontally along the common base 52, and by using this interlocking means, the endless winding suspending chains 125*a* and 125*b* are driven to rotate by one motor.

Figure 19:
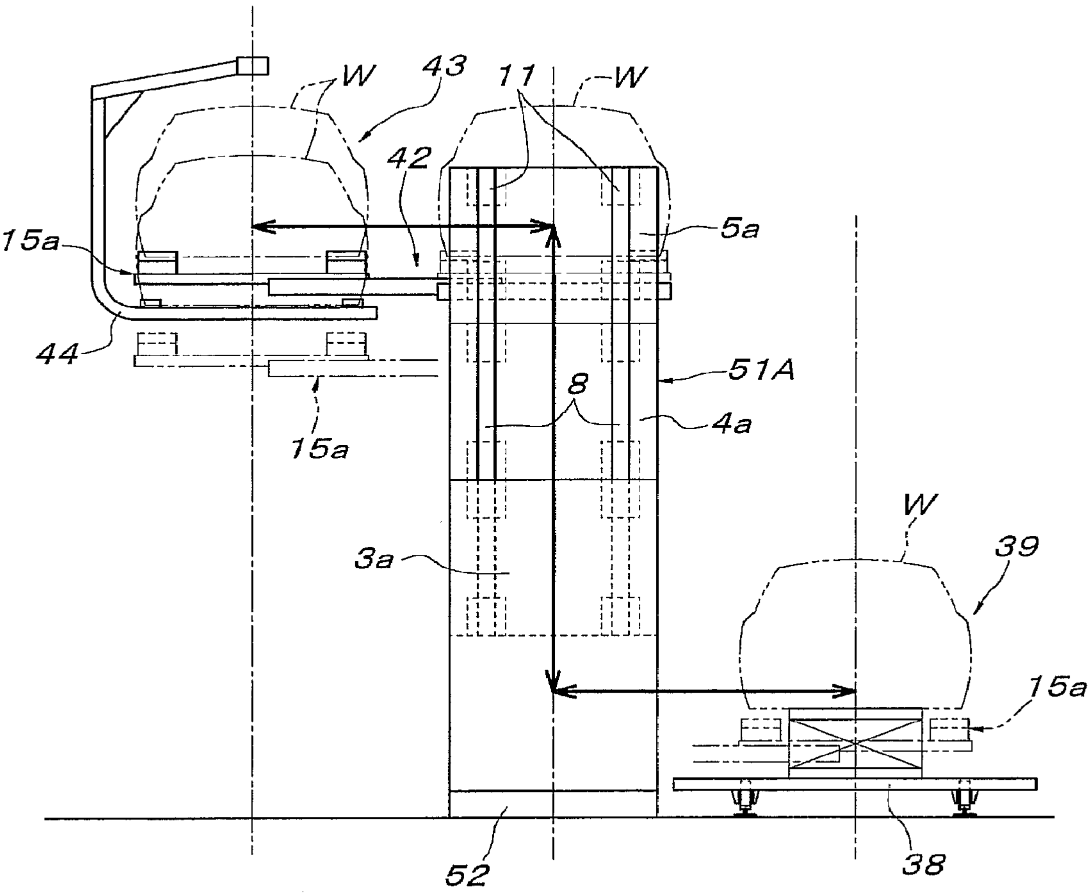
FIG. 19 is a side view showing a transfer device of a sixth embodiment.

FIG. 19 shows a sixth embodiment using, as a transfer means of the fifth embodiment, a transfer means 42 including running forks 15*a* and 15*b* that can be advanced forward and rearward from a fully withdrawn position as a home position. In this sixth embodiment, the object W can be transferred to both the front and rear sides of an elevating conveyance position between the multistage extensible columns 51A and 51B, so that as described in the aforementioned third embodiment, when the floor surface conveyance line 39 and the overhead conveyor line 43 are separated laterally in a plan view, by setting the above-described transfer device at an intermediate position between the floor surface conveyance line 39 and the overhead conveyor line 43 in the plan view, the object W can be transferred between the conveyance carriage 38 stopping at a fixed position on the floor surface conveyance line 39 and a object suspending conveyance hanger 44 stopping at a fixed position on the overhead conveyor line 43.

Figure 20:
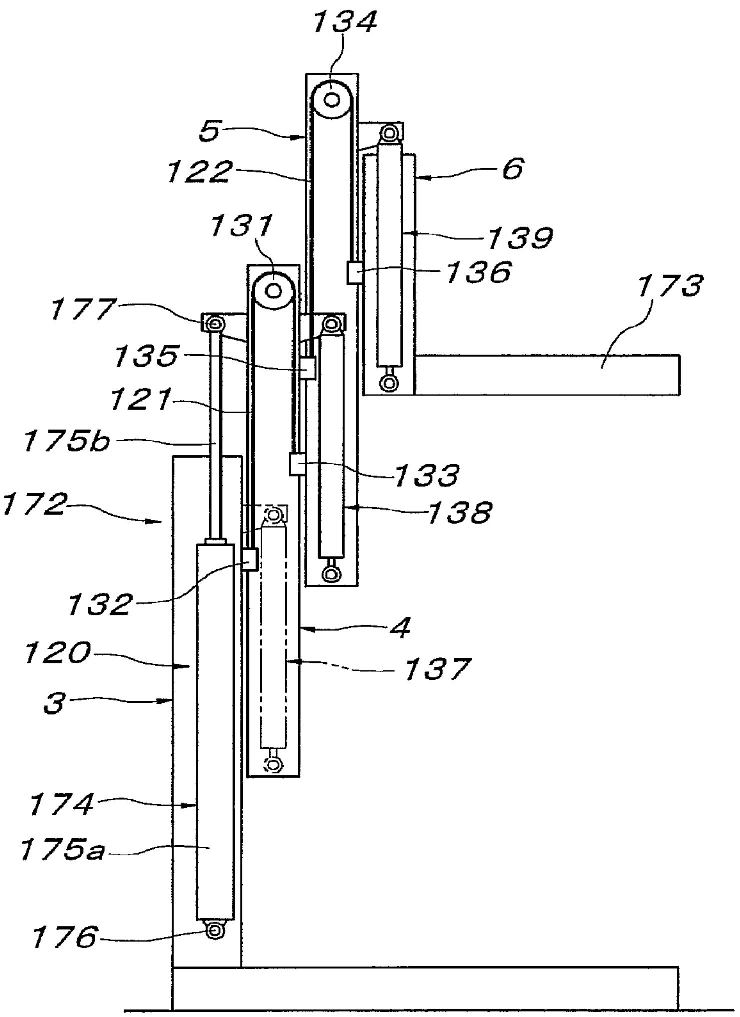
FIG. 20 is a side view showing a transfer device of a seventh embodiment.

In the above-described embodiment, the mid-stage elevating column portions and the final-stage elevating portions are provided in pairs of left and right in parallel, and these pairs of left and right mid-stage elevating column portions and left and right final-stage elevating portions move vertically in synchronization with each other or integrally, however, when the object W is a small-sized light-weight object, as in the case of the seventh embodiment shown in FIG. 20, the present invention can also be carried out as an elevating conveyance device using a multistage extensible column 172 including a fixed column portion 3, one first mid-stage elevating column portion 4, one second mid-stage elevating column portion 5, and one final-stage elevating portion 6. The reference numeral 173 denotes an object support base provided in a projecting manner so as to be cantilevered from the final-stage elevating portion 6. In the figure the reference numerals 121 and 122 denote pulley-wound suspending chains, 131 and 134 denote guide wheels, 132, 133, 135, and 136 denote end portion latching tools of the pulley-wound suspending chains 121 and 122, 137 through 139 denote fluid pressure cylinders, and description of these is omitted since these correspond to the pulley-wound suspending chains 121*a* through 122*b*, guide wheels 131*a*, 131*b*, 134*a*, and 134*b*, latching tools 132*a* through 133*b* and 135*a* through 136*b*, and fluid pressure cylinders 137A through 139B of the fourth embodiment, respectively.

As in the seventh embodiment shown in FIG. 20, as the elevating drive means 120 which drives and elevates the first mid-stage elevating column portion 4 with respect to the fixed column portion 3, a fluid pressure cylinder 174 can be used. In the fluid pressure cylinder 174 shown in the figure, a cylinder main body 175*a* is joined to the fixed column portion 3 side by a support shaft 176, and the tip end of the piston rod 175*b* projecting upward is joined to the first mid-stage elevating column portion 4 side by a support shaft 177, however, it is also allowed that, similar to the fluid pressure cylinders 137 through 139 and 137A through 139B, the cylinder main body 175*a* is joined to the first mid-stage elevating column portion 4 side and the tip end of a piston rod 175*b* projecting downward is joined to the fixed column portion 3 side. As a matter of course, it is allowed that the fluid pressure cylinders 137 through 139 and 137A through 139B are set upside down and cylinder main bodies are joined to the fixed column portion or the previous elevating column portion similar to the fluid pressure cylinder 174, and tip ends of the piston rods projecting upward are joined to the next elevating column portion or final-stage elevating column portion. As shown in FIG. 20, when the fluid pressure cylinder 174 is used as the elevating drive means 120, it is possible that the fluid pressure cylinder 137 which urges the first mid-stage elevating column portion 4 upward with respect to the fixed column portion 3 is omitted and the fluid pressure cylinder 174 as the elevating drive means 120 is commonly used as the fluid pressure cylinder 137 as a balance weight which urges the first mid-stage elevating column portion 4 upward. In other words, the fluid pressure cylinder as a balance weight which urges the first mid-stage elevating column portion 4 upward can be commonly used as the elevating drive means 120.

In the seventh embodiment of FIG. 20, only one mid-stage elevating column portion 4 is driven and elevated by the elevating drive means 120, and synchronous elevating of the pair of left and right first mid-stage elevating column portions 4*a* and 4*b* is not necessary, so that the elevating drive means 120 can be easily constituted by the fluid pressure cylinder 174, however, even in the case of the elevating conveyance device using the pair of left and right first mid-stage elevating column portions 4*a* and 4*b*, by using an interlocking mechanism which synchronizes the vertical movements of the pair of left and right first mid-stage elevating column portions 4*a* and 4*b*, the fluid pressure cylinder can be used as the elevating drive means 120 even in the above-described embodiment using the pair of left and right mid-stage elevating column portions 4*a* and 4*b*.

In the above-described embodiment, as the mid-stage elevating column portions, the first mid-stage elevating column portions 4*a* and 4*b* and the second mid-stage elevating column portions 5*a* and 5*b* are provided, however, if the lifting distance necessary for the transfer means 14 and 42 is shorter, the second mid-stage elevating column portions 5*a* and 5*b* can be omitted, and on the contrary, if the lifting distance necessary for the transfer means 14 and 42 is longer, three or more mid-stage elevating column portions can be provided. It is a matter of course that examples of use of the transfer device are not limited to the illustrated examples.

Further, in the elevating conveyance device of the present invention, the transfer means 14 and 42 as an object support thereof that moves vertically, more specifically, the transfer means 14 and 42 including a load cradle that can advance and withdraw horizontally and consists of running forks 15*a* and 15*b* are provided, and even if the transfer means 14 and 42 which transfer an object horizontally are installed on an object support that moves vertically as in the embodiments described above, without limiting to the running fork type, various conventionally known conveyor type or drawing and pushing pusher type transfer means can also be used. As a matter of course, it is possible that only carriage guide rails are laid on the object support that moves vertically so that a conveyance carriage is transferred onto guide rails laid on a target floor surface, and according to the circumstances, it is also allowed that only an object support surface is provided as the object support that moves vertically and a cart or the like is transferred onto and from a target floor surface.

It should be understood, of course, that the specific form of the invention herein illustrated and described is intended to be representative only, as certain changes may be made therein without departing from the clear teachings of the disclosure. Accordingly, reference should be made to the following appended claims in determining the full scope of the invention.

What is claimed is:

1. An elevating conveyance device comprising: a base; a multistage extensible column extensible vertically stood on the base; an object support; and an extending and contracting drive mechanism, wherein the multistage extensible column includes a fixed column portion to be fixed onto the base, one or more mid-stage elevating column portions movable vertically with respect to the fixed column portion, and a final-stage elevating portion movable vertically with respect to the mid-stage elevating column portion, the object support is provided on the final-stage elevating portion of the multistage extensible column, and the extending and contracting drive mechanism is provided in the fixed column portions and includes an elevating drive means which drives and elevates the next mid-stage elevating column portion, pulley-wound type winding suspending chains which are provided in the mid-stage elevating column portions and convert upward movement of the mid-stage elevating column portions with respect to the previous column portion into an upward movement of the next mid-stage elevating column portion or final-stage elevating portion with respect to the mid-stage elevating column portion, a fluid pressure cylinder which urges the next mid-stage elevating column portion upward with respect to the fixed column portion, and fluid pressure cylinders which urge the next mid-stage elevating column portion or final-stage elevating portion upward with respect to the mid-stage elevating column portion.

2. The elevating conveyance device according to claim 1, wherein cylinder main bodies of the fluid pressure cylinders are attached to the previous column portions, and piston rods projecting downward from the cylinder main bodies so as to advance and withdraw are arranged in a direction of suspending the next mid-stage elevating column portion or final-stage elevating portion.

3. The elevating conveyance device according to claim 1, wherein each of the fluid pressure cylinders generates a fixed upward urging force substantially balanced with the weight of the one mid-stage elevating column portion or the final-stage elevating portion that each of the fluid pressure cylinders directly urges.

4. The elevating conveyance device according to claim 1, wherein the urging force of the fluid-pressure cylinder that urges upward the final-stage elevating portion can be switched to an upward urging force almost balanced with the sum of the weight of this final-stage elevating portion and the weight of the object loaded on the object support.

5. The elevating conveyance device according to claim 1, wherein the elevating drive means includes a winding suspending chain which drives and elevates the next mid-stage elevating column portion with respect to the fixed column portion, and a driving device which drives the winding suspending chain.

6. The elevating conveyance device according to claim 1, wherein as the elevating drive means, the fluid pressure cylinder that urges upward the next mid-stage elevating column portion with respect to the fixed column portion is commonly used.

7. The elevating conveyance device according to claim 1, wherein the multistage extensible support has mid-stage elevating column portions and final-stage elevating portions on both left and right sides of one fixed column portion, the pair of left and right final-stage elevating portions are joined integrally by a horizontal joint member, and the object support is provided on the horizontal joint member so that the object support supports an object on one side of the fixed column portion.

8. The elevating conveyance device according to claim 1, wherein a pair of left and right multistage extensible columns are provided parallel so that their final-stage elevating portions face each other, the final-stage elevating portions of the multistage extensible columns are joined integrally to each other by a horizontal joint member, and the object support is supported by the horizontal joint member so that the object support supports an object between the multistage extensible columns.

9. The elevating conveyance device according to claim 8, wherein the object support has a load cradle that can advance and withdraw horizontally, and this load cradle can advance and withdraw both forward and rearward from a withdrawn position at an intermediate position of the multistage extensible columns.

* * * * *